(12) United States Patent
Shokooh et al.

(10) Patent No.: US 12,074,940 B2
(45) Date of Patent: Aug. 27, 2024

(54) UTILITY NETWORK PROJECT MODELING AND MANAGEMENT

(71) Applicant: OPERATION TECHNOLOGY, INC., Irvine, CA (US)

(72) Inventors: Farrokh Shokooh, Irvine, CA (US); Tanuj Khandelwal, Irvine, CA (US); Shervin Shokooh, Irvine, CA (US)

(73) Assignee: OPERATION TECHNOLOGY, INC., Irvine, CA (US)

( * ) Notice: Subject to any disclaimer, the term of this patent is extended or adjusted under 35 U.S.C. 154(b) by 0 days.

(21) Appl. No.: 17/466,846

(22) Filed: Sep. 3, 2021

(65) Prior Publication Data

US 2022/0060541 A1 Feb. 24, 2022

Related U.S. Application Data

(63) Continuation of application No. PCT/US2020/021286, filed on Mar. 5, 2020.

(60) Provisional application No. 62/814,241, filed on Mar. 5, 2019.

(51) Int. Cl.
*H04L 67/1095* (2022.01)
*G06F 16/27* (2019.01)
*G06Q 10/101* (2023.01)

(52) U.S. Cl.
CPC .......... *H04L 67/1095* (2013.01); *G06F 16/27* (2019.01); *G06Q 10/101* (2013.01)

(58) Field of Classification Search
CPC .... H04L 67/1095; G06F 16/27; G06Q 10/101
See application file for complete search history.

(56) References Cited

U.S. PATENT DOCUMENTS

| | | | |
|---|---|---|---|
| 9,574,432 B2 | 2/2017 | Ringer et al. | |
| 2003/0140132 A1 | 7/2003 | Champagne et al. | |
| 2003/0179230 A1* | 9/2003 | Seidman | G06F 3/1454 715/750 |
| 2007/0043752 A1* | 2/2007 | Zacharla | H04L 41/085 |
| 2010/0293278 A1* | 11/2010 | Boyd | G06Q 30/0253 709/206 |
| 2011/0296432 A1* | 12/2011 | Rajan | G06F 9/52 717/171 |
| 2012/0109590 A1* | 5/2012 | Trainer | G06F 30/00 703/1 |

(Continued)

FOREIGN PATENT DOCUMENTS

| | | | | |
|---|---|---|---|---|
| CN | 1755720 A | * | 4/2006 | ............ G06F 16/21 |
| CN | 102595096 A | * | 7/2012 | |

(Continued)

OTHER PUBLICATIONS

WO, PCT/US20/21286 ISR and Written Opinion, dated May 28, 2020.

*Primary Examiner* — Shean Tokuta
(74) *Attorney, Agent, or Firm* — One LLP

(57) ABSTRACT

Provided herein are embodiments of systems, devices, and methods for a digital collaborative system for electric, water and gas engineering and operations. The systems, devices, and methods include an automatic and intelligent synchronization of simultaneous and parallel project or digital twin modifications between multiple users in a collaborative environment that integrates utility engineering and operation teams.

12 Claims, 36 Drawing Sheets

(56) References Cited

U.S. PATENT DOCUMENTS

| | | | |
|---|---|---|---|
| 2013/0120368 A1* | 5/2013 | Miller | G06T 19/00 345/419 |
| 2013/0123948 A1* | 5/2013 | Reid | G05B 19/41845 700/20 |
| 2013/0227126 A1 | 8/2013 | Imes et al. | |
| 2014/0200863 A1* | 7/2014 | Kamat | E02F 9/245 703/1 |
| 2014/0278269 A1* | 9/2014 | Winn | H04L 69/329 703/1 |
| 2014/0337760 A1* | 11/2014 | Heinrich | G06F 40/166 715/753 |
| 2015/0019486 A1* | 1/2015 | Gaikwad | G06F 16/27 707/625 |
| 2015/0193404 A1* | 7/2015 | Danziger | G06F 40/197 715/229 |
| 2015/0213157 A1* | 7/2015 | Hepworth | G06F 30/00 703/1 |
| 2015/0373068 A1* | 12/2015 | Allen | H04L 65/1069 709/204 |
| 2016/0041840 A1* | 2/2016 | Daouk | G06Q 10/02 718/108 |
| 2016/0171740 A1* | 6/2016 | Yerli | G06T 13/80 345/473 |
| 2016/0195864 A1* | 7/2016 | Kim | H04L 41/0886 709/221 |
| 2018/0032997 A1* | 2/2018 | Gordon | G06Q 30/0269 |
| 2018/0129276 A1* | 5/2018 | Nguyen | G06F 3/0304 |
| 2018/0164790 A1* | 6/2018 | Reid | G05B 19/054 |
| 2019/0155870 A1* | 5/2019 | Prakash | G06F 40/103 |
| 2021/0264686 A1* | 8/2021 | Prunier | G06Q 10/10 |
| 2021/0397402 A1* | 12/2021 | Ashkenazi | H04L 63/105 |
| 2022/0060541 A1* | 2/2022 | Shokooh | G06F 16/27 |

FOREIGN PATENT DOCUMENTS

| | | | | |
|---|---|---|---|---|
| CN | 202502191 U | * | 10/2012 | |
| CN | 103093034 A | * | 5/2013 | |
| CN | 103490523 A | * | 1/2014 | |
| CN | 204256103 U | * | 4/2015 | |
| CN | 205027856 U | * | 2/2016 | |
| CN | 105701850 A | * | 6/2016 | G06T 13/20 |
| CN | 205899770 U | * | 1/2017 | |
| CN | 205899771 U | * | 1/2017 | |
| CN | 205941724 U | * | 2/2017 | |
| CN | 205941725 U | * | 2/2017 | |
| CN | 206147757 U | * | 5/2017 | |
| DE | 112005001152 T5 | * | 6/2007 | G05B 19/409 |
| EP | 2592511 A2 | * | 5/2013 | |
| EP | 3300005 A1 | * | 3/2018 | G05B 23/0205 |
| JP | 2015216630 A | * | 12/2015 | G06F 16/2358 |
| KR | 101762629 B1 | | 8/2017 | |
| WO | WO-2012058607 A2 | * | 5/2012 | G06F 17/50 |
| WO | WO-2016023619 A1 | * | 2/2016 | G06F 16/955 |
| WO | WO-2020181152 A1 | | 9/2020 | G06F 16/27 |
| WO | WO-2020209832 A1 | * | 10/2020 | G06F 40/169 |

* cited by examiner

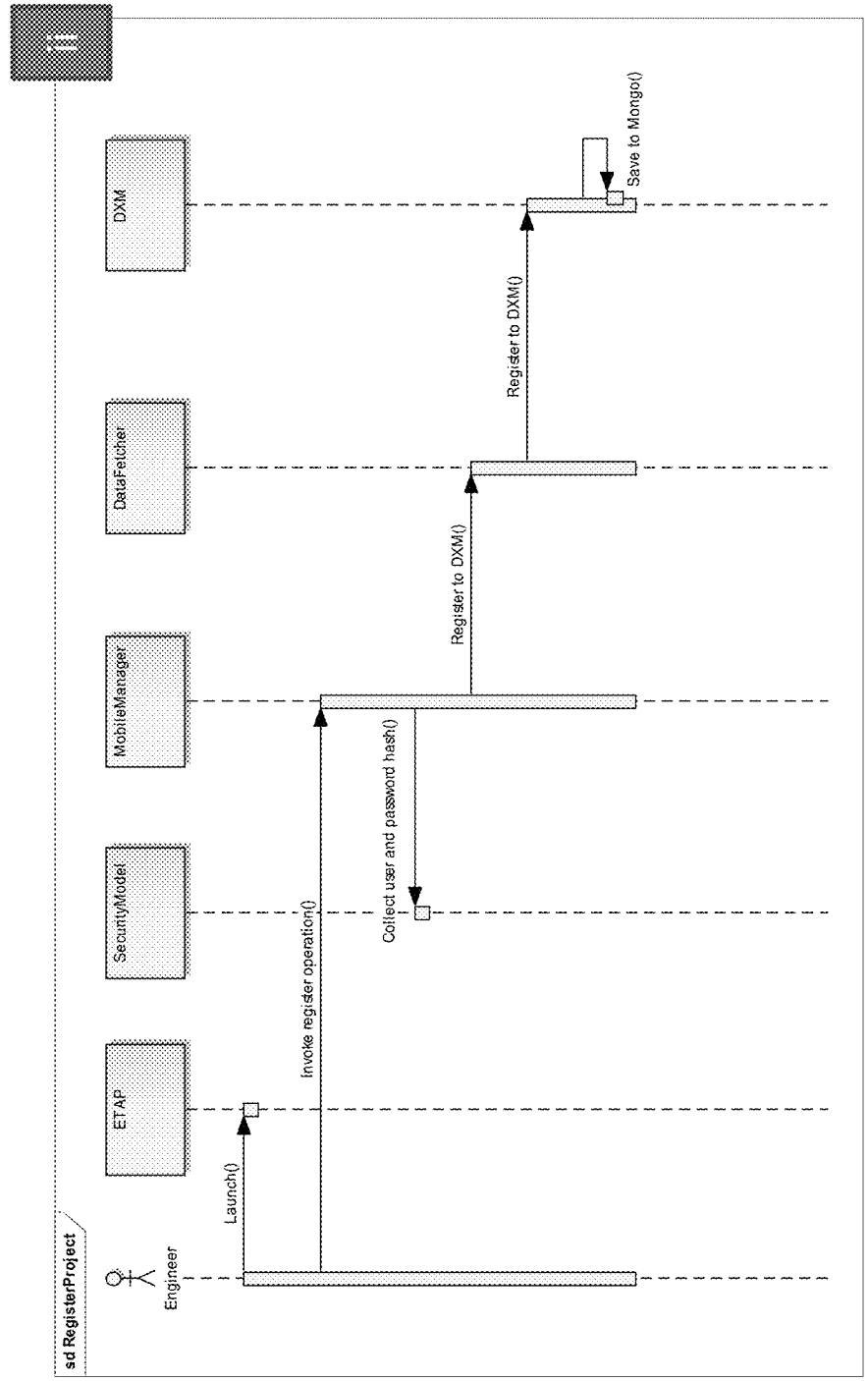
FIG. 8B(ii)

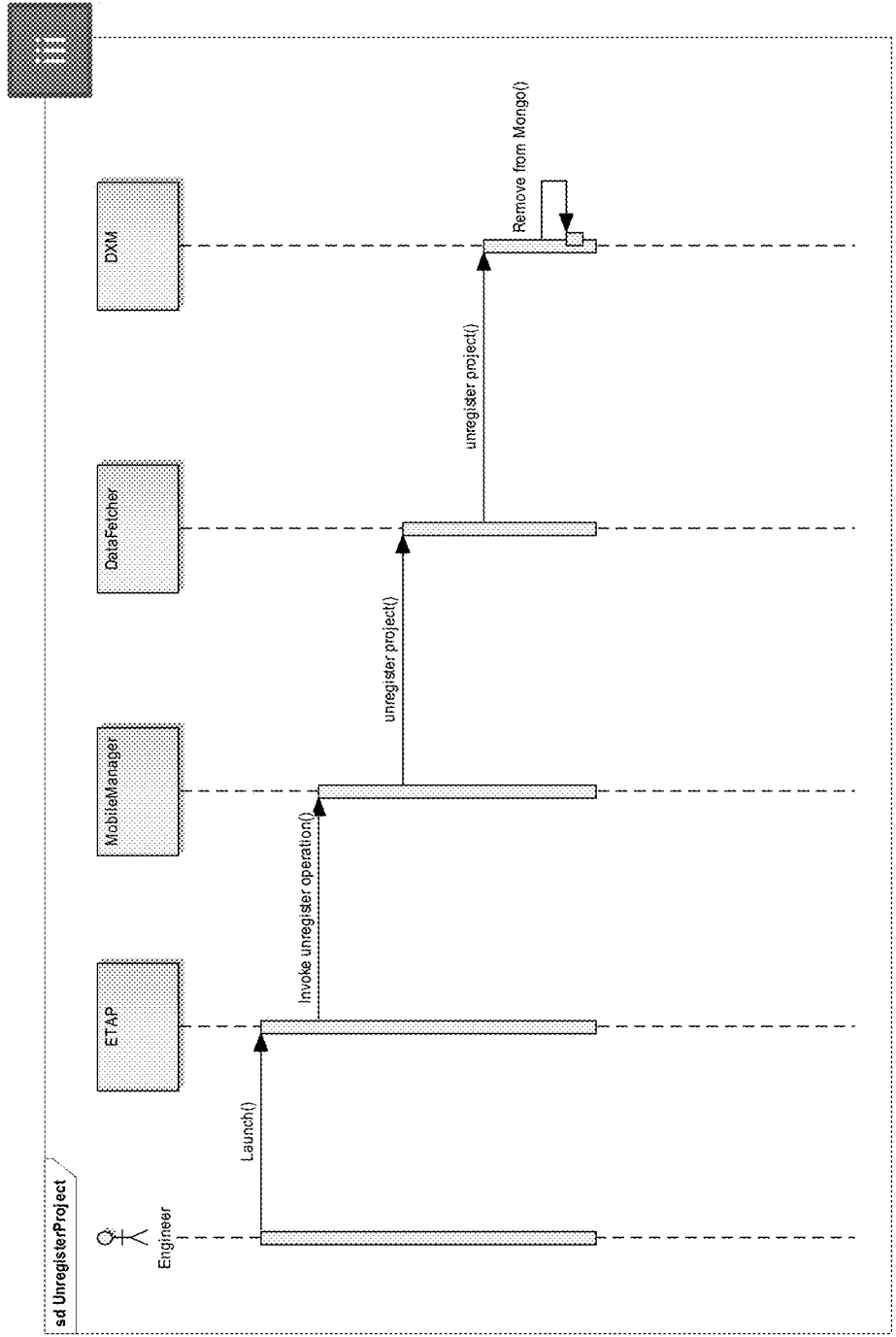
FIG. 8B(iii)

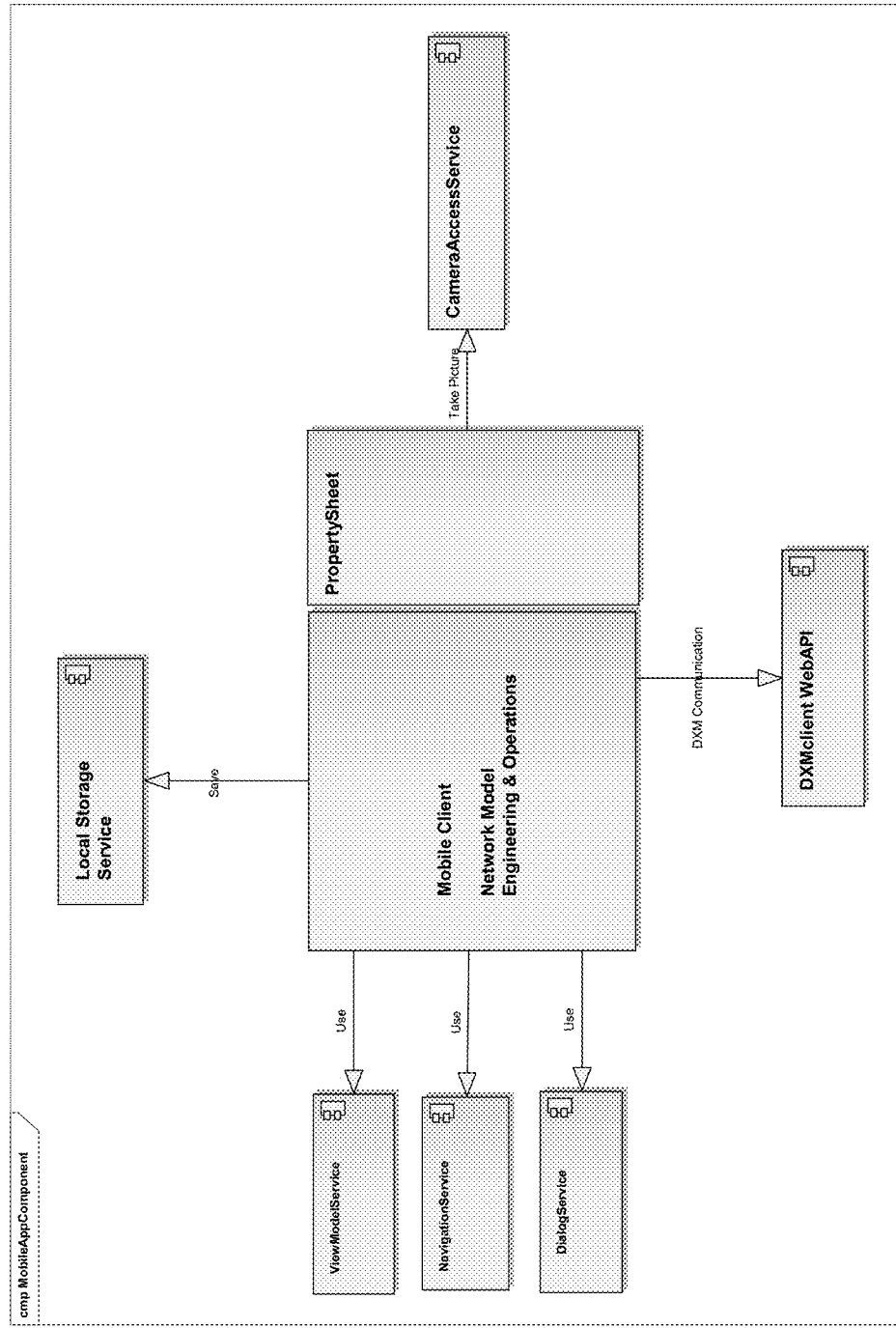
FIG. 8D(1)

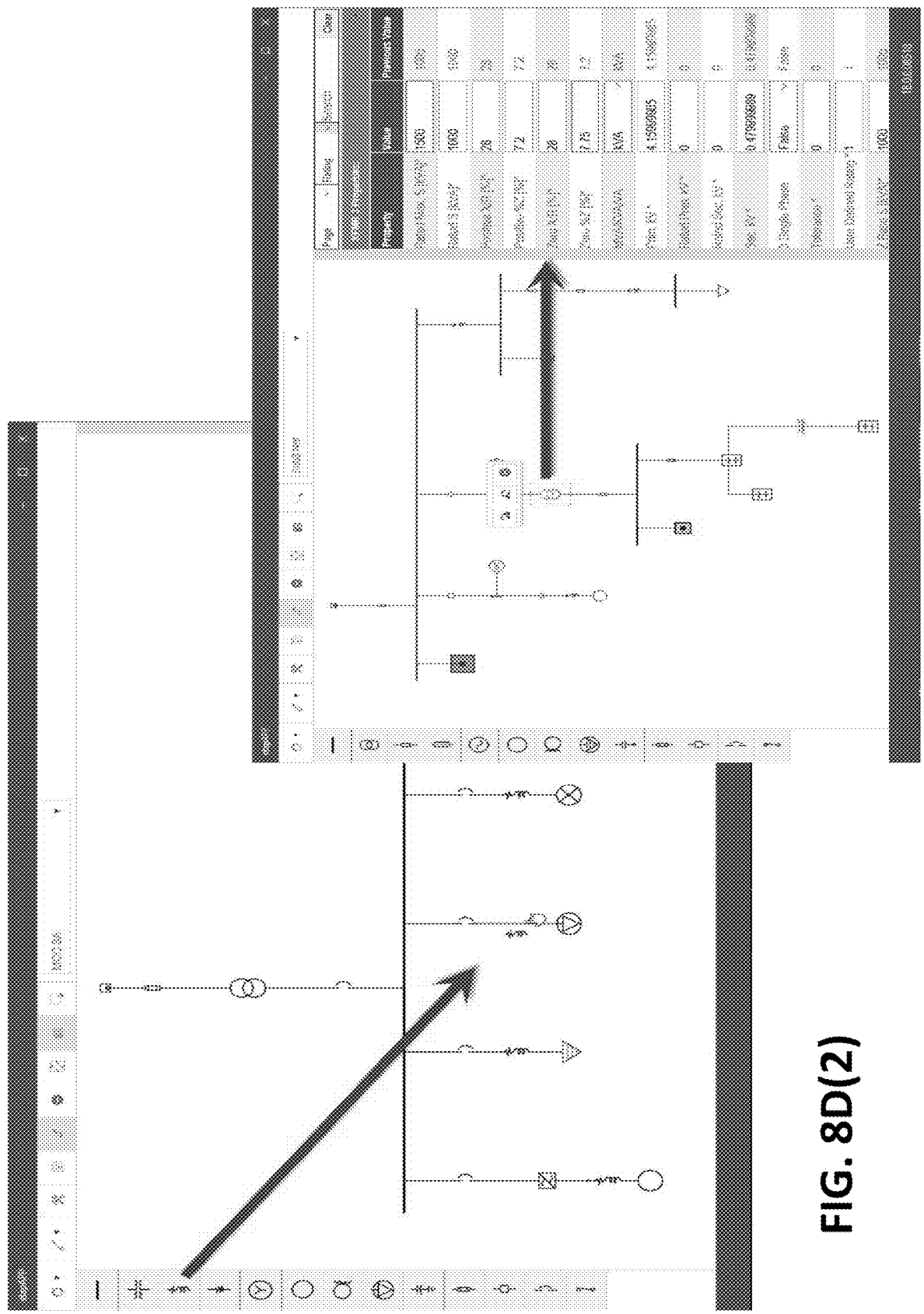
FIG. 8D(2)

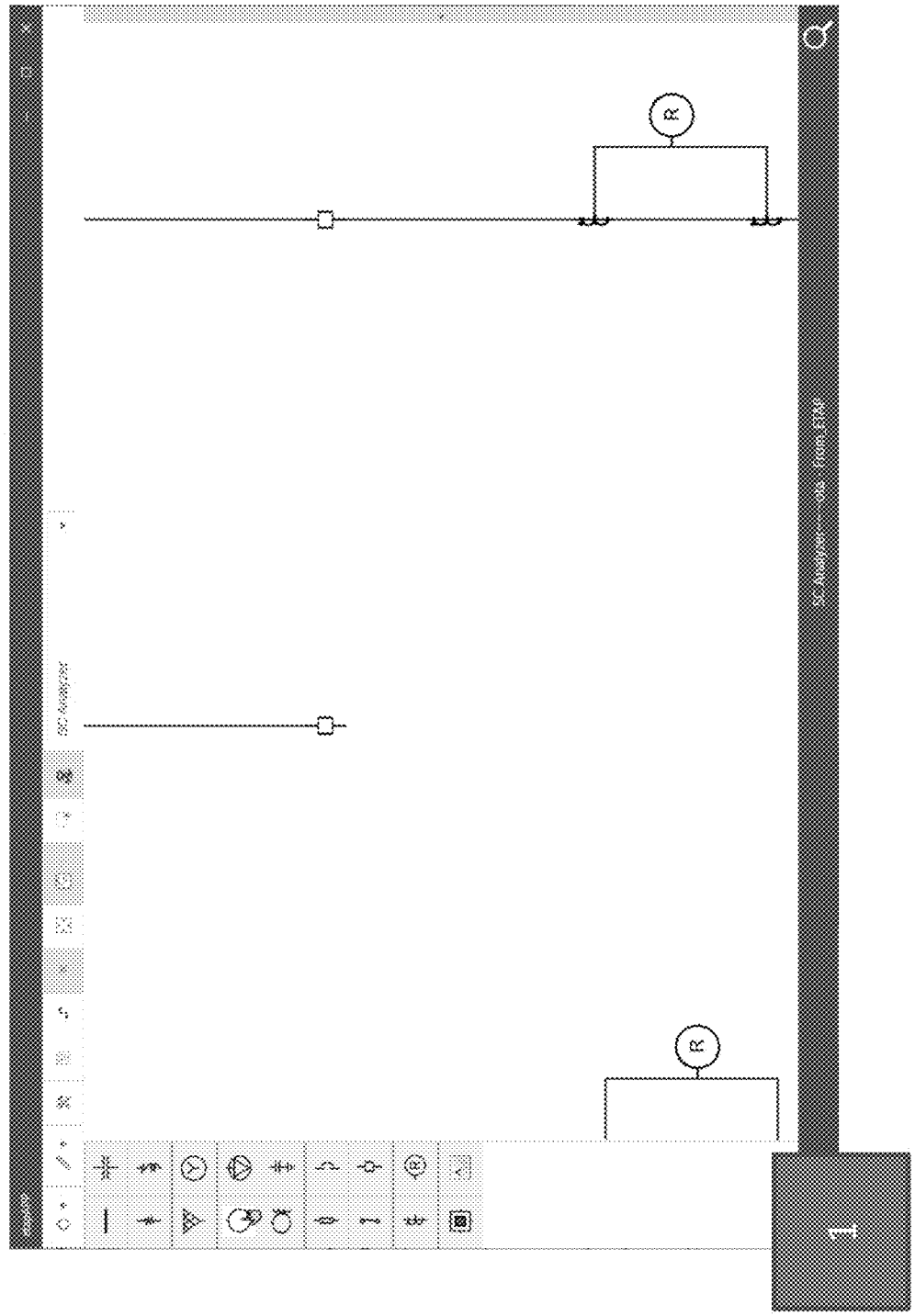
FIG. 8J(1)

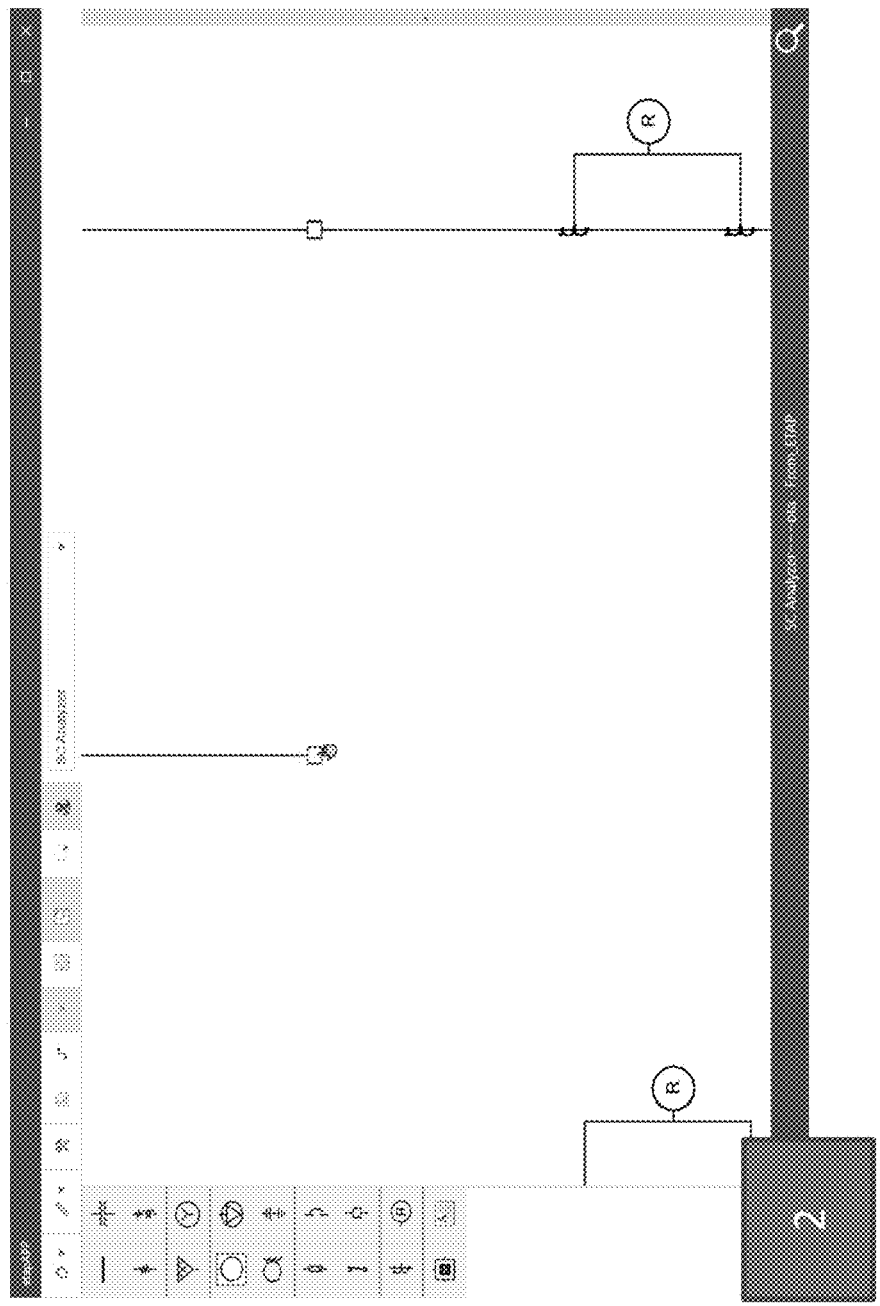
FIG. 8J(2)

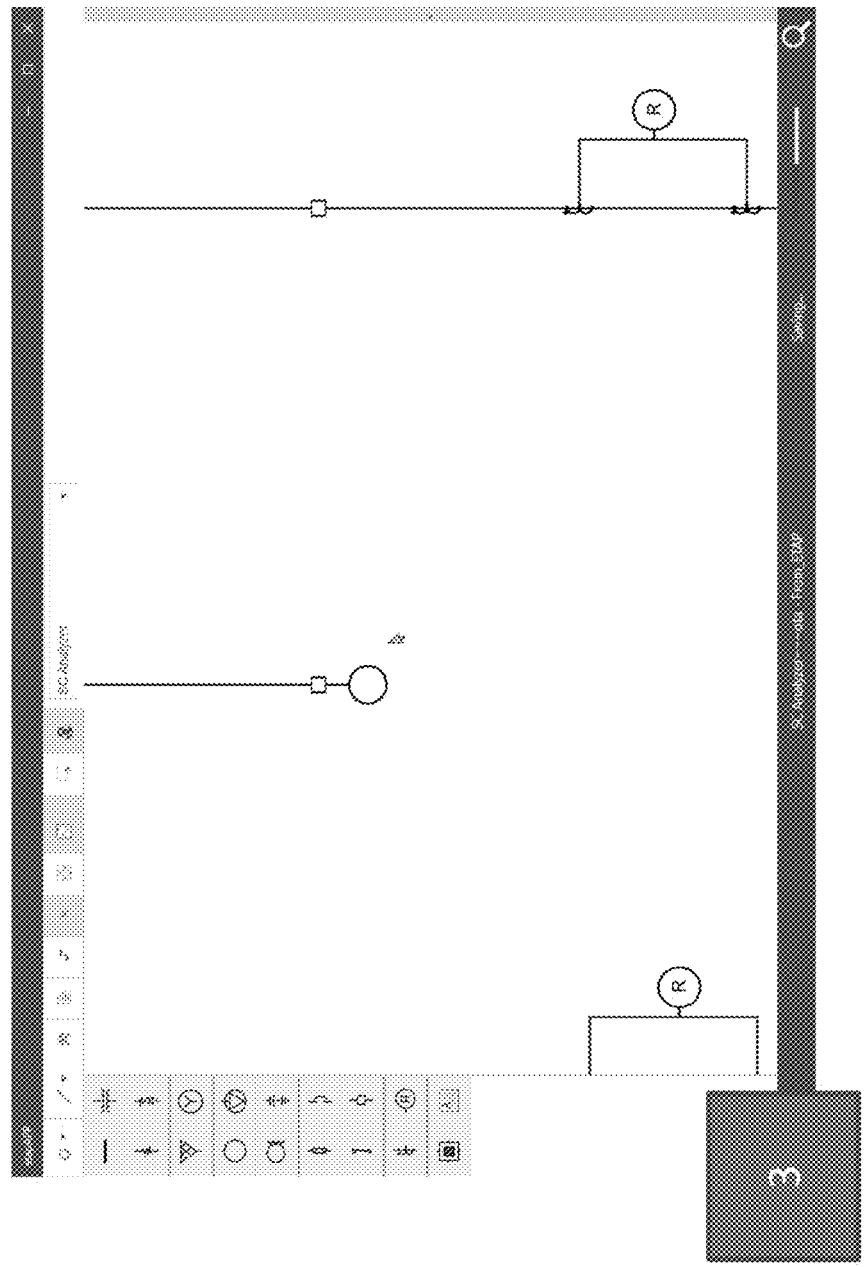
FIG. 8J(3)

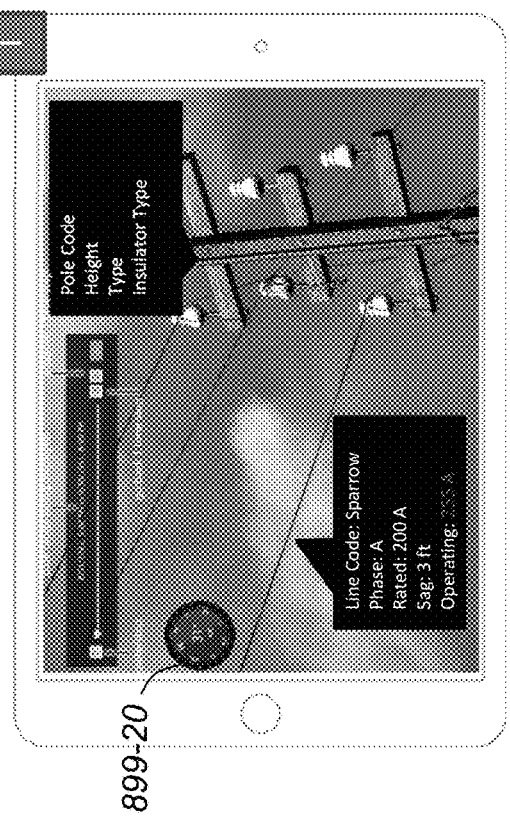
FIG. 8P(i)
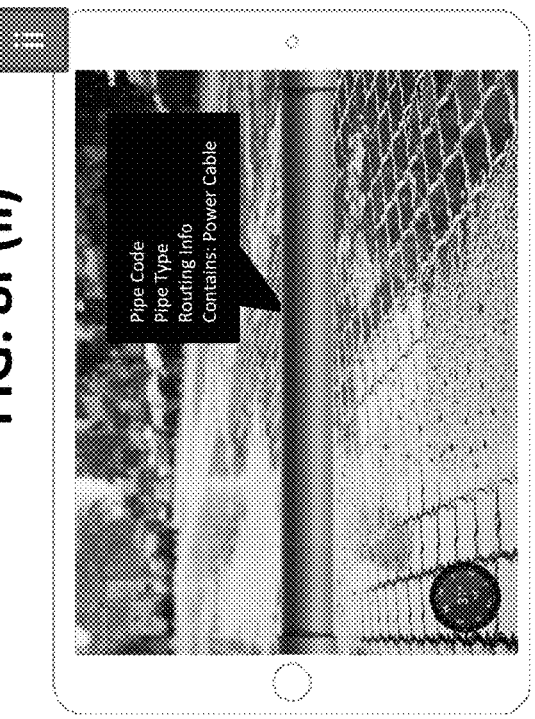
FIG. 8P(ii)
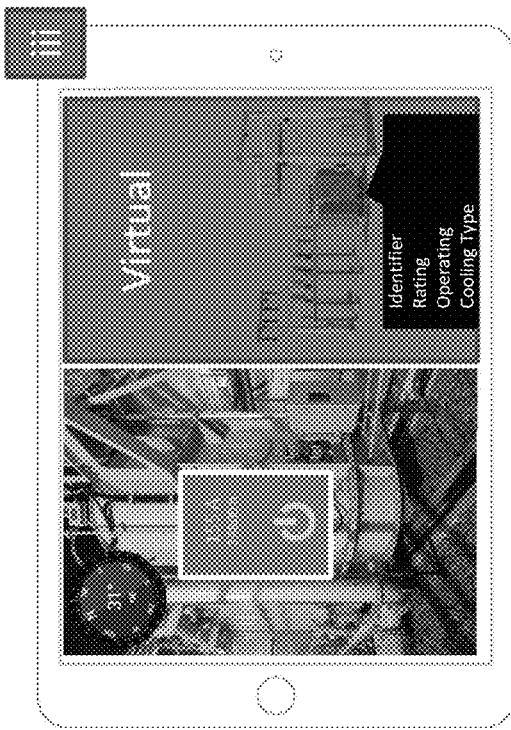
FIG. 8P(iii)
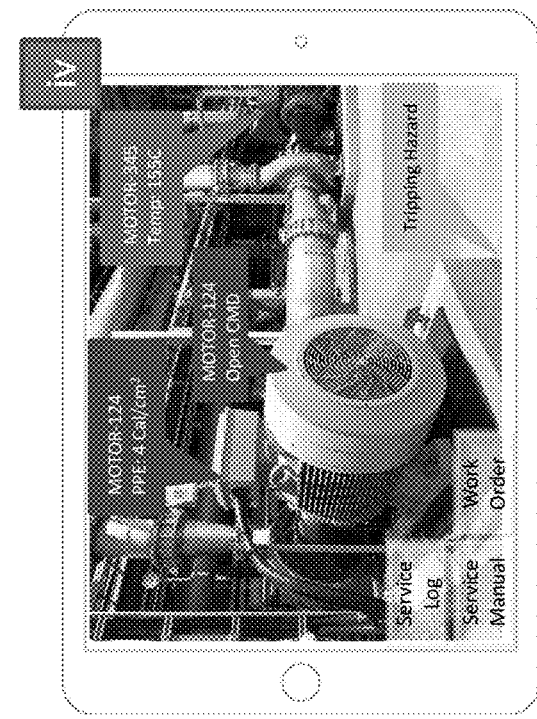
FIG. 8P(iv)

UTILITY NETWORK PROJECT MODELING AND MANAGEMENT

CROSS-REFERENCE TO RELATED APPLICATIONS

This application is a continuation of International Patent Application No. PCT/US2020/021286, filed Mar. 5, 2020, which claims priority pursuant to U.S.C § 119(e) to U.S. Provisional Patent Application No. 62/814,241, filed Mar. 5, 2019, the disclosures of both of which are hereby incorporated by reference in their entireties for all purposes.

FIELD

The subject matter described herein relates generally to systems, devices, and methods for a digital collaborative system for electric, water and gas engineering and operations. More particularly, the disclosure relates to an automatic and intelligent synchronization of simultaneous and parallel project or digital twin modifications between multiple users in a collaborative environment that integrates utility engineering and operation teams.

BACKGROUND

Network projects consist of a digital twin, that represents equipment variables and functions, context and connectivity logic, logical or geospatial network visualization (2D and 3D), three-dimensional or four-dimensional planning models, event and actions coupled with real-time and /or historical data. 2D and 3D models usually represent coordinates such as x, y and z from a geospatial or logical perspective. Planning models described as three-dimensional include visualization (2D or 3D), network topology or configuration and engineering property variations. Planning models described as four-dimensional include visualization (2D or 3D), network topology or configuration, engineering property variations and finally engineering property variation as function of time. Keeping this information in synchronization with multiple engineers collaborating at the same time has been a challenge and has been traditionally done using version control or maintaining multiple copies of the project model. Due to the insurmountable challenges in keeping multiple copies and versions of graphic and database oriented information synchronized amongst multiple users, historically, these complex power system projects have been planned and strategized against a timeline that accounted for sequential objectives due to the transfer of the model from one engineer to another which can result in a gradual degradation of the model caused by inconsistencies in data and lack of proper information transfer across subsystems to a master operational model.

Thus, needs exist for systems, devices and methods for a technical improvements solution for automatic and intelligent synchronization of simultaneous and parallel project modifications, topology synchronization, data integration, model coordination and validation, and information transfer across the entire life cycle of the network between multiple users in a collaborative environment that integrates engineering and operation teams without the above mentioned and other disadvantages. This integration exists over several platforms inclusive of desktop clients, mobile clients, and thin clients.

SUMMARY

Provided herein are example embodiments of systems, devices and methods (also referred to herein as "NetPM") for an automatic and intelligent synchronization of simultaneous and parallel project modifications between multiple users in a collaborative environment that integrates engineering and operation teams. NetPM may include DataHub, etapAPP (described further below), Data Exchange Manager (DXM) or Transaction Manager, local databases, local and remote queues, master models and databases.

In some embodiments, the present disclosure generally provides a system for technical improvements and practical applications in supporting parallel engineering via digital collaboration and project management for utility system life cycle including engineering design, network analysis, and operation processes. However, it should be noted that the present disclosure may also be used for other non-utility systems.

Also provided herein are example embodiments of systems, devices and methods (also referred to herein as "etapAPP") for an automatic and intelligent synchronization of simultaneous and parallel project modifications between multiple users in a collaborative environment that integrates engineering and operation teams between thin clients inclusive of mobile and web interfaces and other thin clients or between thin clients and desktop clients.

Other features and advantages of the present invention are or will become apparent to one skilled in the art upon examination of the following figures and detailed description, which illustrate, by way of examples, the principles of the present invention.

The systems, methods, and apparatuses for digital collaborative system for electric, water and gas engineering and operations described herein in detail are only example embodiments and should not be considered limiting. Other configurations, methods, features and advantages of the subject matter described herein will be or will become apparent to one with skill in the art upon examination of the following figures and detailed description. It is intended that all such additional configurations, methods, features and advantages be included within this description, be within the scope of the subject matter described herein and be protected by the accompanying claims. In no way should the features of the example embodiments be construed as limiting the appended claims, absent express recitation of those features in the claims.

Aspects and advantages of the invention will be set forth in part in the following description, or may be obvious from the description, or may be learned through practice of the invention.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 8B(ii) illustrates a project registered with the DXM to be synchronized with other clients, according to some embodiments of the present disclosure.

FIG. 8B(iii) illustrates a project unregistered from the DXM, according to some embodiments of the present disclosure.

FIG. 8D(1) illustrates various exemplary services included with the Mobile Client, according to some embodiments of the present disclosure.

FIG. 8D(2) illustrates an exemplary embodiment where a network asset is selected to display the engineering properties associated with that asset, according to some embodiments of the present disclosure.

FIGS. 8J(1) to 8J(3) illustrate exemplary embodiment where touch screen input is used to add an object based on pre-defined engineering rules, according to some embodiments of the present disclosure.

FIG. 8O illustrates an exemplary high-level diagram of a process where the image acquisition is from a camera, according to some embodiments of the present disclosure.

FIGS. 8P(iii) to 8P(v) illustrate exemplary views with extended reality, according to some embodiments of the present disclosure.

DETAILED DESCRIPTION

Figure 1A:
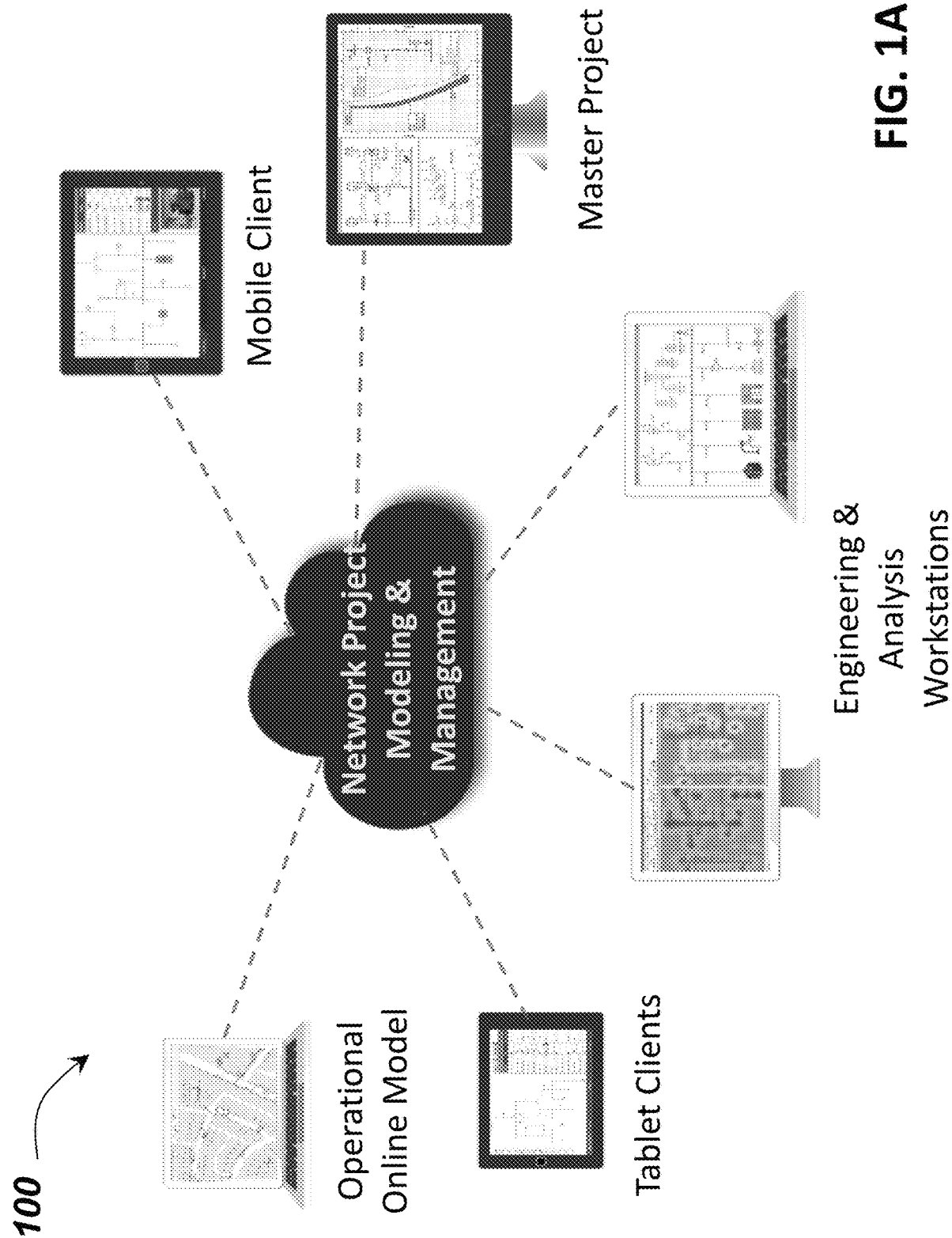
FIG. 1A illustrates an exemplary conceptual architecture for network project modeling and management, according to some embodiments of the present disclosure.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

The present disclosure may include a system and method for providing network model synchronization and management for network models. In some embodiments, the system and method may provide multiple databases that are divided into multiple systematic databases based on areas of responsibility including, for example, at least one local model per user, DXM model storage and a master model. Data may be automatically or manually transferred into a common model from all local models with or without user intervention based at least in part on a timestamp associated with the transferred data. The data transferred into the common model from all local models may then be automatically or manually synchronized into a master model through rules, validation and logic checking. The master model can then broadcast the validated model to all connected clients.

In some embodiments, the system and method may include a complete local database stored per user (where area of responsibility is controlling the visualization of information and not the storage of that information) and provide for automatic or manual exchange of complete model data into Data Exchange Manager (DXM) or Transaction Manager and synchronized with the master model. In such embodiments, incremental change data may be validated at least in part on the DXM model storage and merged with data stored in the master model. The system may also provide for broadcasting the merged data to all the local complete models.

The present disclosure may also include systems and methods for controlling operation of a network. In some embodiments, these systems and methods may include a database that may be divided into local databases per user based on area of responsibility. These systems and methods may provide for exchanging data into the DXM database storage, associating network operational changes that is based at least in part on a timestamp, storing the exchanged data in the master model; and exporting the merged operational data that was received from all local databases via the common database such that it can be utilized by network applications and visualized on all other local client/databases that have permission to view this information. Standard, consistent and non-file-based communication and messaging system may be used for communicating the design and operational model between systems. In some embodiments, these systems and methods may also provide operation data changes of a complete model from the local database to the master project database which may then be synchronized to all local databases; where data may be filtered again based on area of responsibility. These embodiments may provide for validating exchanged incremental change data based at least in part on the local model, merging validated incremental change data with data stored in the DXM model database, and storing the merged data in the master model. Validation may be based at least in part on a profile of a standard model and may also be based at least in part on, for example, voltage, phase, existence of equipment, service, state and connectivity information.

In some embodiments, the present disclosure may also include a system and method for providing network model synchronization, data validation, power analysis, operational information and overall asset management for a network model on a thin client platform inclusive of mobile, web or other thin client systems and platforms regardless of operating system (cross-platform).

Described now are example embodiments of systems, devices and methods of the present disclosure for an automatic synchronization of simultaneous and parallel project modifications between multiple users in a collaborative environment that integrates engineering and operation teams (also referred to herein as "NetPM").

In some embodiments, the present disclosure may include a system for technical improvements and practical applications in supporting parallel engineering via digital collaboration and project management for system life cycle including engineering design, network analysis, and operation processes. In some practical applications, the present disclosure may be implemented for electrical power network, water network, gas network, etc.

Valuable time, for example, hundreds of hours, can be saved with this efficient new multi-user platform for project execution and management. Some example key features of the present disclosure may include, to name just a few:

Team-based Engineering Collaboration in Local Networks or Cloud architecture.

Server-client application with multi-dimensional databases.

Automatic and on-demand project synchronization with others.

Information-exchange management for review and approval.

Enforce situational awareness among engineers.

In some embodiments, the system may include a project model configured to represent as-design, as-built, and ongoing updates and changes, a digital project model including system changes and revision for other projects, an integrated multi-discipline engineering collaboration module, an enterprise client and server system architecture with public master database with local clients, a sequenced-database and tracker module for data changes with master message and/or client message record queues, a rule-based module for automatic and on-demand data synchronizations, a smart project management configured to switch from sequential to parallel operation and perform concurrent studies, analysis and reports, a simultaneous multi-user model creation, data collection, and data validation using queue-based operation, a global queue-based project management and control infrastructure via messaging workflow between a master and clients project model communicating with two or more projects, a network modeling manager via web service using, for example web framework hosted on Local Area Networking (LAN), Wide Area Networking (WAN), private and public cloud; and a plurality of synchronized graphical and topology diagrams, study cases/solution parameters, configuration status, engineering properties, plots, reports, and more between various workspaces.

In some embodiments, the present disclosure provides a system for simultaneous modeling, studies, analysis, monitoring, and control of parameters for each synchronized data overlay for both offline and online data. The system may include a collaboration engineering and operation system using data validation, and synchronization between desktop consoles and mobile client forms, a role-based and password authentication manager with data access control for master and client projects, and a project management with supervisory and/or advisory review and control of changes with accept/reject decision.

In some embodiments, the present disclosure may employ a multi-user client/server platform which may include a data exchange manager used to maintain relationship between data on various devices such as, desktop consoles and mobile client forms that allow multiple and simultaneous users to modify and use a single project.

Figure 1B:
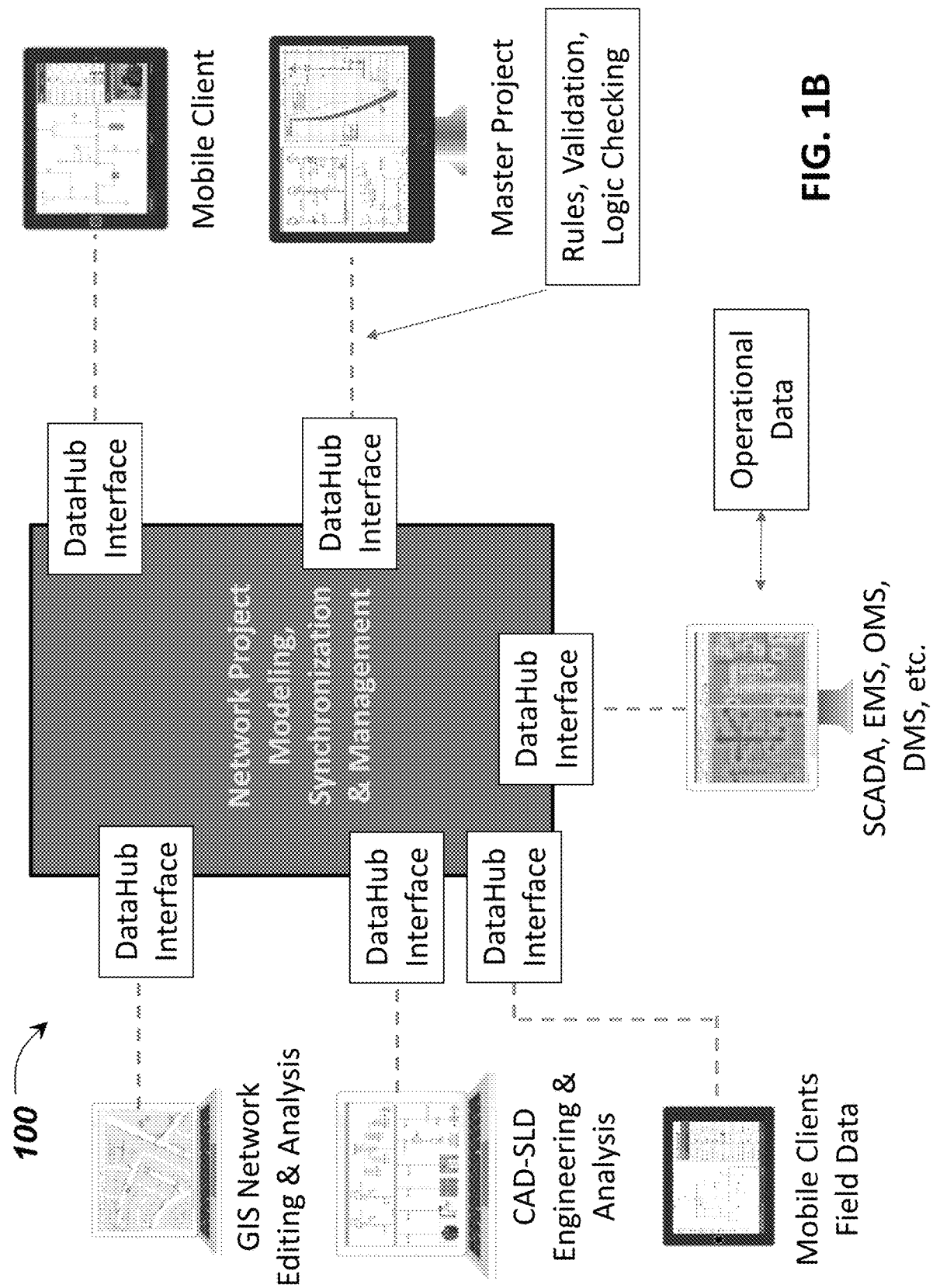
FIG. 1B illustrates an overview of exemplary utilization of master and local databases and the need to visualize or hide information based on area of responsibility, according to some embodiments of the present disclosure.

Turning to the drawings, FIGS. 1A and 1B illustrate exemplary high-level diagrams of a system-wide view 100 of the present disclosure. FIG. 1A illustrates a full and enabling exemplary conceptual architecture for network project modeling and management. In some embodiments, the present disclosure may include a platform for topology synchronization, data integration, model coordination, and information transfer across the entire lifecycle of the network from modeling, engineering analysis, to operation and maintenance. FIG. 1B illustrates an overview of exemplary utilization of master and local databases and the need to visualize or hide information based on area of responsibility.

A platform may be a group of technologies that are used as a base upon which other applications, processes or technologies are developed. A platform may also be the hardware and software on which software applications run.

In some embodiments, the system of the present disclosure may include data and message-queuing processors that manage the dependencies and complexities of an integrated system engineering and operational model which has access to a tabular and graphical representations of model including a synchronized graphical topology (e.g., logical schematic, geospatial information, etc.), study cases/solution parameters, system configuration status, engineering properties, real-time monitored data, and other related system engineering and operational information. Message-queue processors utilize method of local and remote queues to buffer information from multiple clients into a central data exchange system (DXM). DXM is responsible for coalescing, deciphering, verifying, validating, synchronizing, and broadcasting the information to all other clients such that all connected clients always have the same information.

Each collaborative user may have access to the complete or partial system model and data, and each user can have different access permissions in different workspaces. The collaborative engineering system and method permit accurate tracking of system assets from design to operation to achieve shortest project delivery time.

In some embodiments, the present disclosure may be applied by the use of power system modeling, analysis, and operation software application programs on desktop computers, mobile devices, and other forms where individual contributors perform their various tasks such as building one-line diagrams and system schematics and where others conduct similar tasks or perform system studies, monitor, analyze, and control operational assets on the system.

Figure 2A:
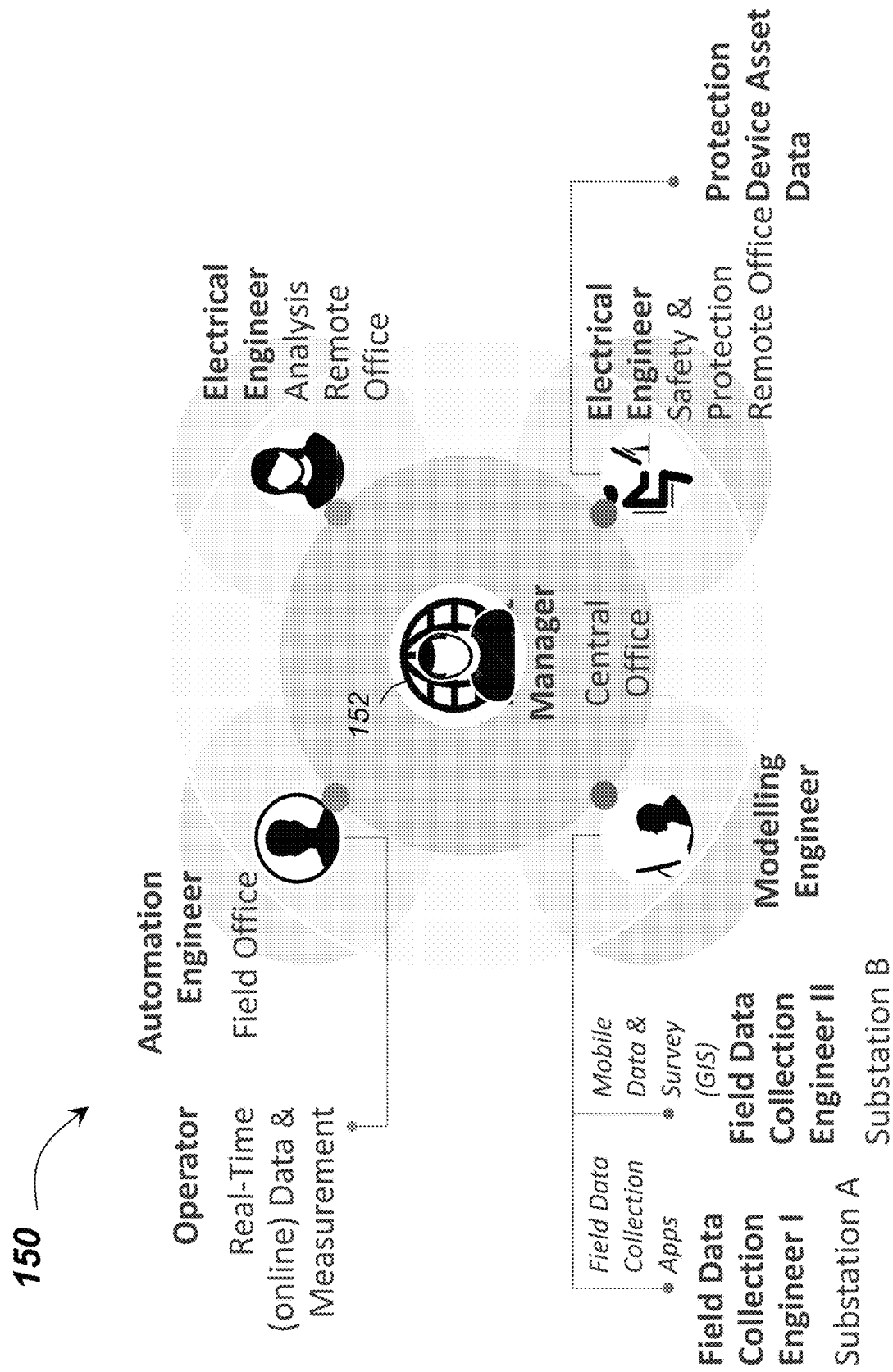
FIG. 2A illustrates an exemplary high-level diagram of a network project modeling and management system, according to some embodiments of the present disclosure.

FIG. 2A illustrates an exemplary high-level diagram of a network project modeling and management system 150 of the present disclosure. In some embodiments, different users, e.g., contributors in a project, may be located in different physical locations. In some practical applications of the system, network system 150 may be a digital collaborative platform for power system engineering and operations. In some embodiments, this system may be referred to as Network Project Modeling and Management system and may include a project manager 152 and other collaborating engineers. The project manager 152 may locate in a central office, while the engineers may locate remotely, for example in the field or in remote offices. The system may, automatically or on-demand request, synchronize the simultaneous and parallel project modifications between multiple contributors in a collaborative queue-based environment. The queue may include complete project and transactional information including multiple combinations of network assets, connectivity, engineering properties per asset, graphical locations (schematic 2D, 3D, geospatial), analysis information used to develop 'what-if' scenarios such as network topologies/configuration, multiple views or presentations that represent graphical rearrangement of network assets, 4D (includes changes in engineering properties, connectivity, operating condition, topology, number of assets, location of assets as function of planning period or time), 'what-if' simulation results, field equipment operating values, maintenance crew location and status, field equipment alarms, key performance indicators. Message payload for messages of the same type may be packaged into single stream however the payload may be broken into parallel fragments of appropriate size to be sent in parallel depending upon bandwidth, type of message, number of changes the message carries and the relationship between the messages. Message payload for messages that are not of the same type may be placed in parallel streams and further broken into parallel fragments of appropriate size that are further parallelized depending upon bandwidth, number of changes the message carries and the relationship between the messages. Data transmission may include option to encode and decode with encryption algorithms including AES-256, 3DES, Cast, Blowfish and message formats including concurrent combinations of Common Information Model, MultiSpeak, XML, Web API, IEC 61850, OPC-DA, OPC-UA, DNP3, COMTRADE, PQDIF, SS1, ENTSO-E, Modbus, JSON, MessagePack, TCP, UDP, Google Protocol Buffers, Apache Avro. The communication and messaging between the various workspaces can be via web service using web framework hosted on Local Area Networking (LAN), Wide Area Networking (WAN), private and public Cloud.

Hosted Service System

Figure 2B:
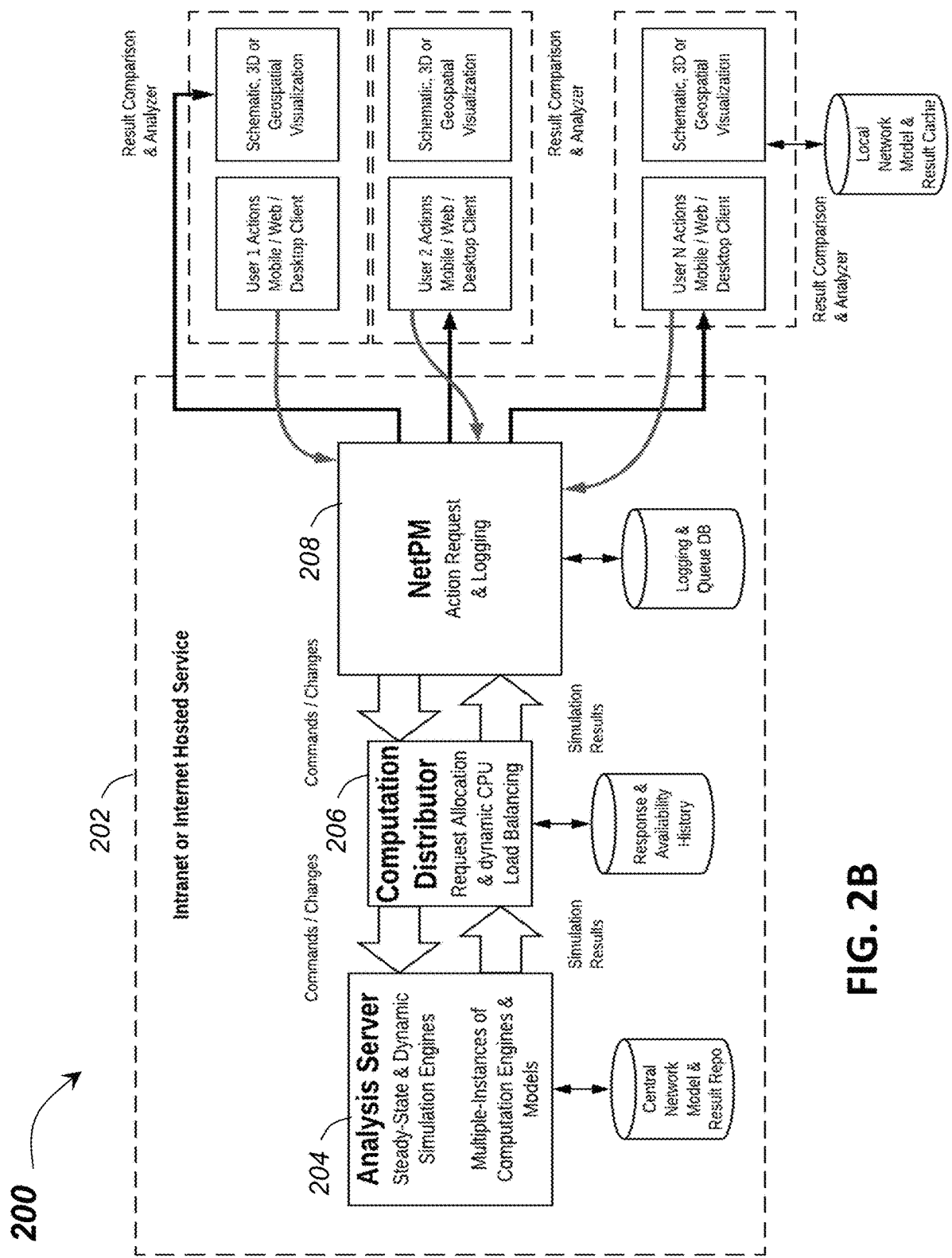
FIG. 2B illustrates a high-level diagram of an exemplary hosted service system, according to some embodiments of the present disclosure.

FIG. 2B shows a high-level diagram 200 of an exemplary hosted service system 202 according to some embodiments of the present disclosure. In some practical applications, the hosted system 202 may provide power system simulation. FIG. 2B shows an Analysis Server 204 as a foundation for a thin client or mobile based power system analysis offering all advantages of cloud and distributed computing. The software does not need to be installed on a specific desktop computer or notebook and may be accessible through Login and Password everywhere through Intranet or Internet. The software may be contained in a mobile application which can be installed on cross-platform mobile device.

The system may include an analysis server 204 capable of receiving at least engineering changes, operational changes, topology changes and other "what if" ad hoc actions from operators or engineers (shown as User 1, User 2, . . . User N).

In some embodiments, the analysis server may have a web-based schematic or single-line diagram view and/or geospatial view to visualize results locally. In some embodiments, a power system model may be located centrally as part of the analysis server and distributed to other client machines, for example, on-demand or on-update.

The analysis server may include a computation distributor 206 that monitors the analysis server computation load and dynamically creates multiple instances of a computation engine on a main computing device or distributed on several computing devices.

The analysis server may allow for server-side simulation. In some embodiments, numerical calculations and visualization (generation of plots and other computer graphics) may be carried out on the analysis server, while the interactive graphical user interface (GUI) may be on the client side in form of a mobile application or web interface.

User request can be received from one or many clients at the same time. These requests can include, for example, changes in network configuration, engineering data, etc. The requests may be sent to a web service located in a private or public cloud and processed via NetPM 208. NetPM may route the request to a computation distributor that functions as a load balancer checking for available analysis servers based on the computational load. If an analysis server is not busy, then the request is passed to the appropriate computation engine based on the request. Once the computation engine is launched, it prepares the network model needed to perform the simulation. New requests are introduced into the computation engine while it performs each task. The engine is "alive" during the entire phase or receiving one or more requests. Results are continuously written to a server side in-memory database. The results are transmitted via NetPM back to the local client that initiated the request for simulation. Only the results for the devices are returned based on the subscription of devices from the client to the server.

Figure 3:
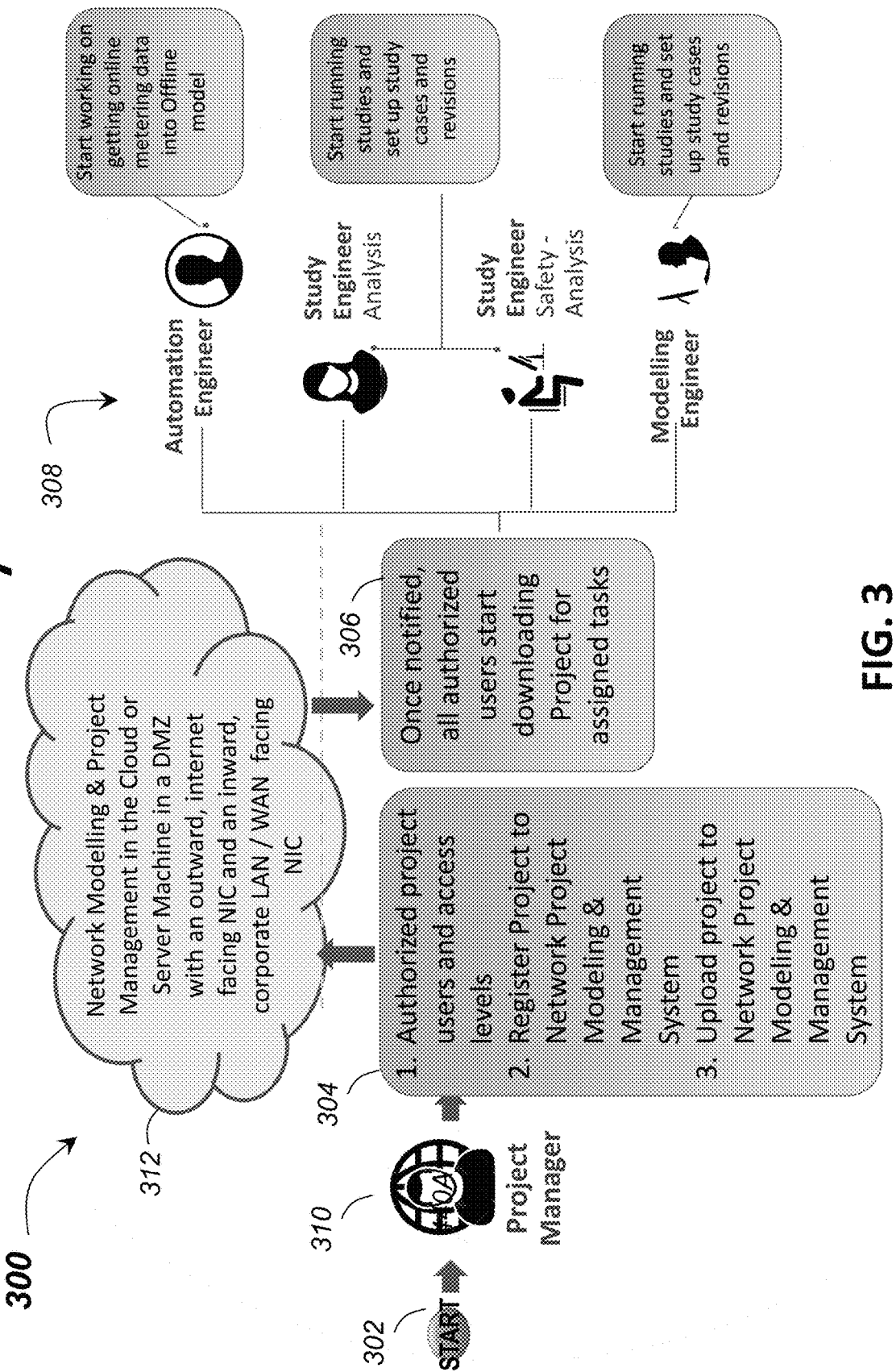
FIG. 3 illustrates an overview of a user journey in terms of the deployment of the system in the organization using an on-premise or cloud hosted option, according to some embodiments of the present disclosure.

FIG. 3 is an exemplary high-level diagram illustrating various tasks of various contributors as supported by the system of the present disclosure. The diagram illustrates an exemplary collaboration process and overview 300 of a user journey in terms of the deployment of the system in an organization using an on-premise or cloud hosted option, according to some embodiments of the present disclosure.

For example, at the start 302, the system may provide interfaces and functions for a project manager 310 to perform at least the tasks shown in box 304.

As shown in the cloud 312, in some embodiments, the users of the system may use various types of user devices which are connected to a server, which may be distributed on one or more logical and/or physical servers, each having processor(s), memory, an operating system, an input/output interface, and a network interface all known in the art. The server and the user devices may be coupled to a public network, such as the Internet, a cellular-based wireless network and/or a WiFi network. The server may locate in a cloud architecture, or in a network DMZ with an outward, Internet facing NIC and an inward, corporate LAN/WAN facing NIC. User devices may include mobile devices such as wearable, mobile phone, tablet and laptop, and desktop computer. The user devices may include at least one processor, and non-transitory computer readable memory for storing program and software instructions executable by the processor.

In some embodiments, at 306 the system may notify all authorized users (or contributors) to start downloading Project for assigned tasks. The system may receive request for download from user devices and download data for the requested assigned tasks. At 308 the various contributors may now run their projects and access the system for data, as shown in the examples in FIG. 3.

Figure 4:
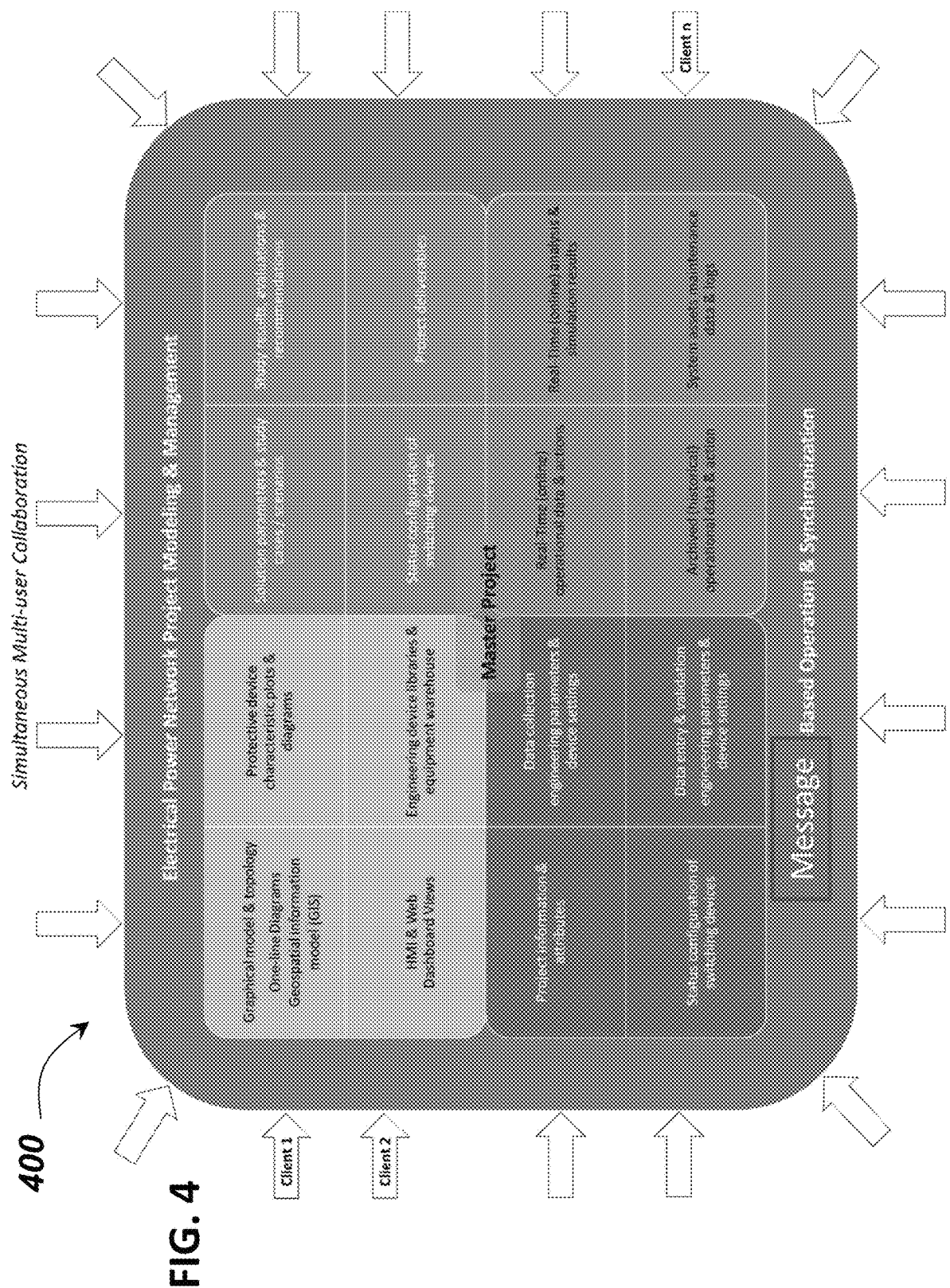
FIG. 4 illustrates exemplary detailed information exchanged between a master project and the client projects via NetPM interface where changes from each local database or workstation is synchronized on-demand (queue-based) or instantaneous (first come-first serve) basis, according to some embodiments of the present disclosure.

FIG. 4 illustrates an exemplary high-level diagram 400 practical application of the present disclosure, illustrating a message-based synchronization and overlay between various workspaces to manage updates, additions, and modifications for network project modeling and management. FIG. 4 also illustrates exemplary detailed information exchanged between a master project and the client projects via NetPM interface where changes from each local database or workstation is synchronized on-demand (queue-based) or instantaneous (first come-first serve) basis. More specifically the diagram illustrates an exemplary message-based synchronization and overlay between various workspaces to manage updates, additions, and modifications in the following:

Graphical model and topology of the network including but not limited to single line diagram/drawing, one-line diagram, flow diagrams, control system schematic, geospatial information (GIS) diagram, Human Machine Interfaces (HMI), dashboard views, web views, etc. between various section of the model.

Engineering device libraries and equipment warehouse.

Protective device characteristic plots and diagrams (e.g., Time current Characteristic Curves, R-X diagrams, Time Distance Characterizes graphs, etc.).

Synchronization of project file information and attributes (e.g., Title, user/engineer names, scope, dates, logs, etc.).

Data collection of engineering parameters and device settings.

Data entry and validation engineering parameters and device settings.

Engineering parameters and device settings data provisioning (base and revision data).

Status configuration of switching devices (Open, Close), and status/mode of equipment (e.g., In Service, Out of Service).

Solution parameters and study cases/scenarios for various power system analysis studies.

Power system study results, evaluation, and recommendation.

Project deliverables in the form of study reports, graphs, data blocks, schematics, tables, or others.

System assets maintenance data and logs.

Real-time (online operation) monitored data and actions.

Real-time (online operation) analysis and simulation results.

Archived (historical) operational data and action.

Figure 6:
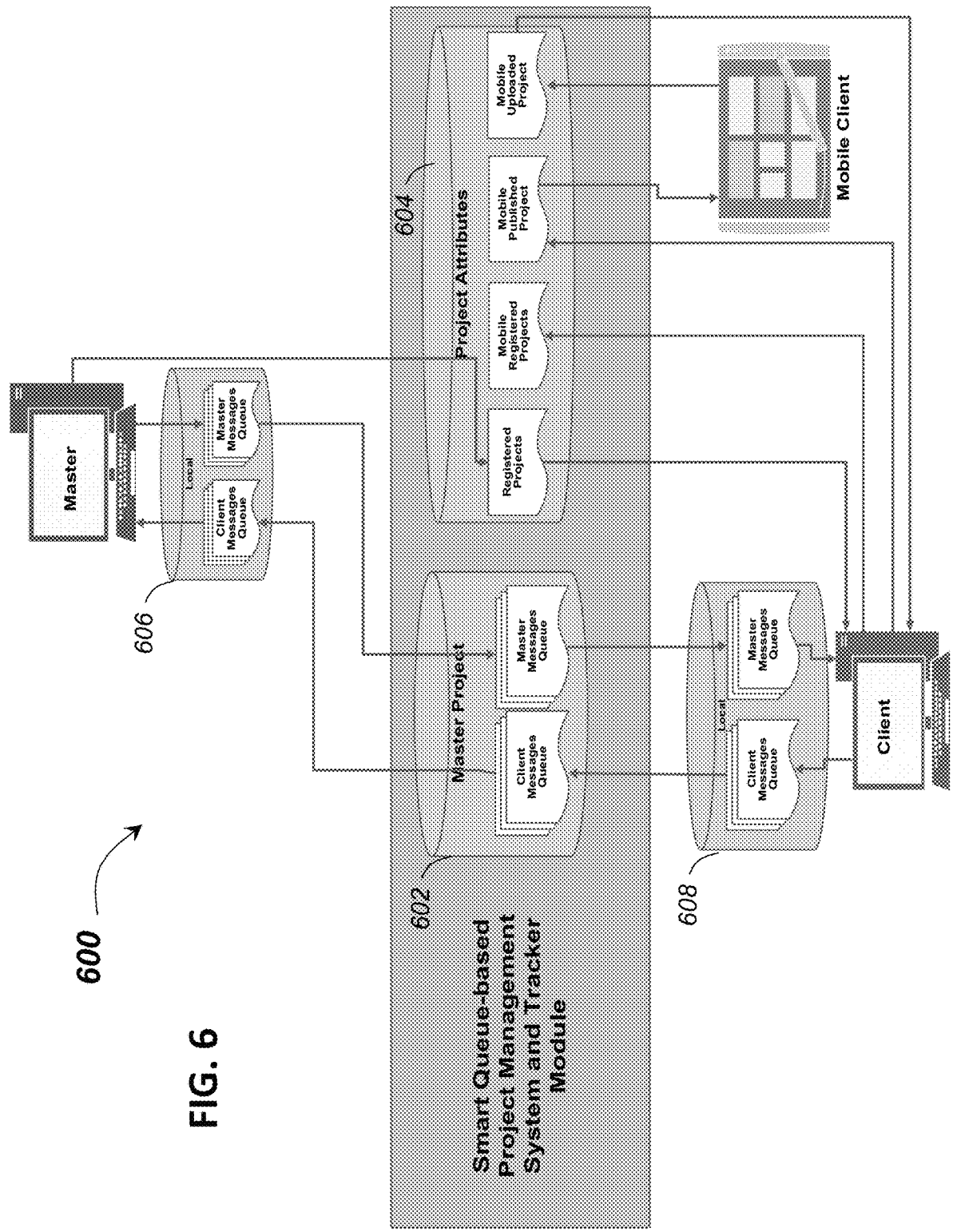
FIG. 6 illustrates an overview of the queue-based project management system with auditing and tracking capability, according to some embodiments of the present disclosure.

In some embodiments, the above data may be stored in a central database, for example, a Project Master database as shown in FIG. 6. The project database can be RDMS, NoSQL or object oriented. A single database may be used to store information such as a NoSQL database that provides a mechanism for storage and retrieval of data that is modeled in means other than tabular relations. Alternatively, high efficiency databases per task type are utilized and related to each other based on persistent global asset or equipment identifier to maintain cohesiveness. For example, network model and topology relationships typically utilize a graph database with graph structures for semantic queries with nodes, edges and properties to represent and store data. Historical and operating values typically utilize a time series database, thin client databases utilize a cross-platform system that can be used on disk or in memory. Message-based system is responsible for data conversion from one client to another that may be utilizing dissimilar database types.

Figure 5:
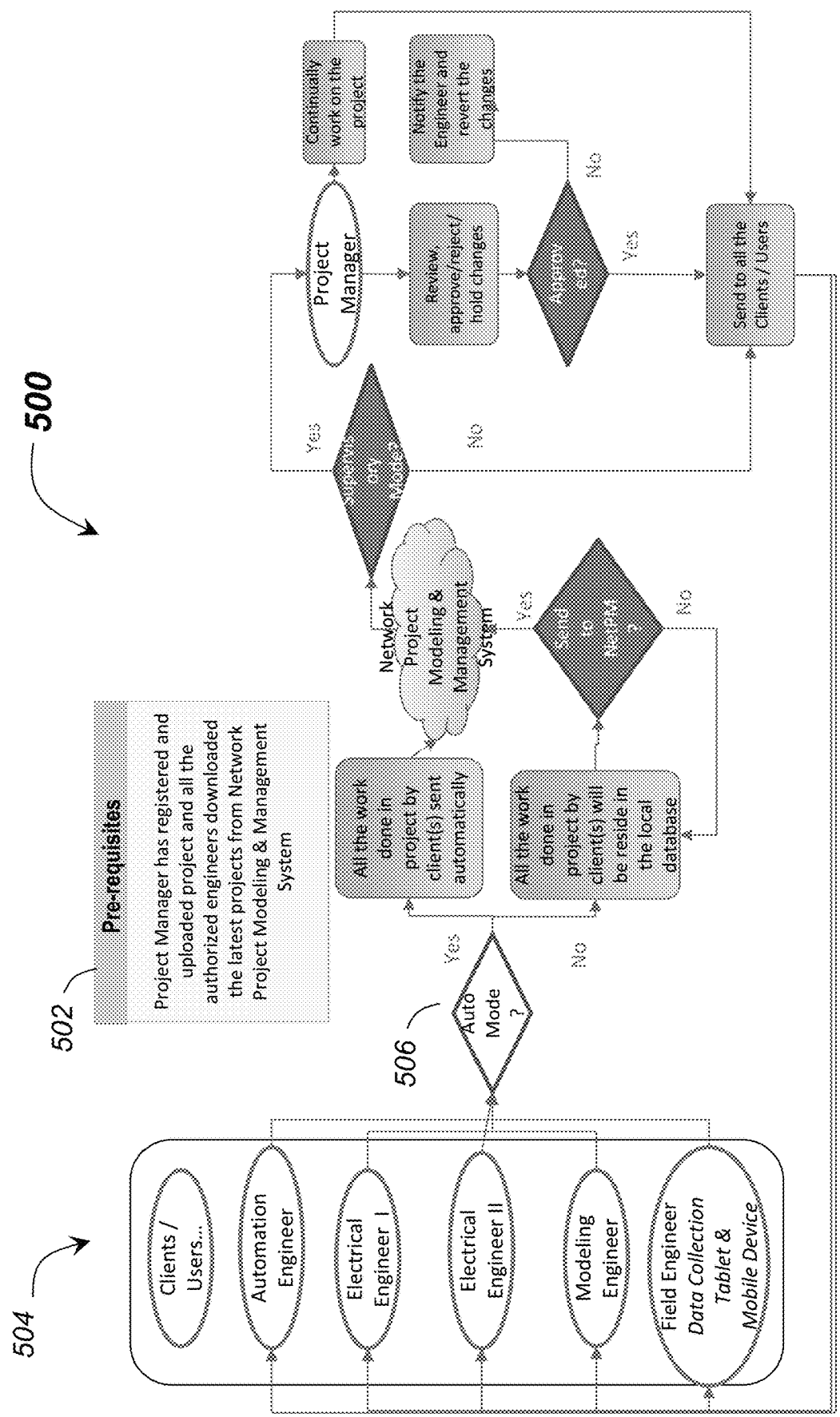
FIG. 5 illustrates an exemplary data path followed by incremental data changes from a local project database changes to a master project database, according to some embodiments of the present disclosure.

FIG. 5 illustrates an exemplary high-level diagram of a practical application of the present disclosure, illustrating a process 500 involving project Master, Clients, and Mobile Clients users and devices with automatic synchronizations of simultaneous project modifications between multiple users using a message queue communication to sequence the requested changes and updates. It illustrates exemplary data path followed by the incremental data changes from the local project database changes to the master project database. In some embodiments, at 502, the system (or Network Project Modeling & Management System) may register a Project Manager and receive uploaded project data and may download the latest projects data to the authorized engineers 504.

FIG. 6 illustrates an exemplary high-level overview data architecture for the exemplary process of FIG. 5. It shows an overview of the queue-based project management system with auditing and tracking capability. In some embodiments, master projects data 602 and project attributes data may be stored in a central database. Users such as project master and engineers (clients) may download data to their local devices. The local devices may include desktops and various mobile devices.

Thin Client, Tablet & Mobile Platforms

In some embodiments, as shown in FIGS. 7-13, the present disclosure also provides systems and methods for solving constraints in thin client environments such as web browsers, thin clients intended for visualization on remote machines, mobile, tablet clients. This section describes example embodiments of the present disclosure using mobile device as an example to collect data for assets and merge the collected data to the master model. Assets or network model components include those used by transmission, distribution, renewable, industrial, water, waste-water, heating, cooling, district heating, water distribution, gas distribution, generation and low voltage power system networks in order to describe the model and symbology in a virtual environment. Further, the master model information may be made available to the mobile device for field verification including engineering properties, network topology, protective device characteristics, power system simulation results. Additionally, operations data inclusive of real-time operating values, network topology, maintenance crew location and maintenance plan may be made available from Engineering or Operations workstation to the mobile client and vice versa.

Figure 7A:
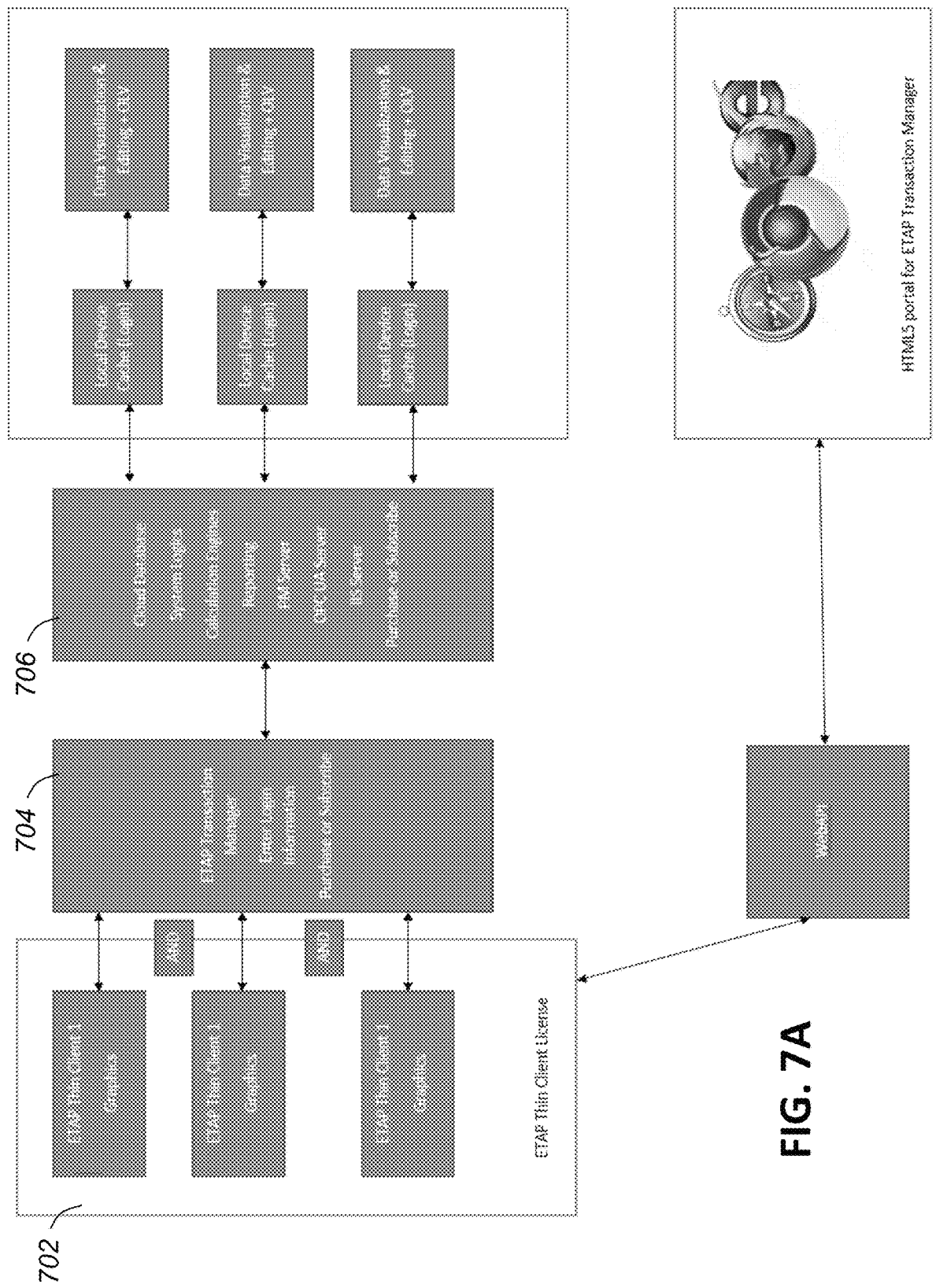
FIG. 7A illustrates an exemplary conceptual diagram showing the connectivity of local devices with local database to thin clients including but not limited to web-browser based clients, thin clients and mobile clients, according to some embodiments of the present disclosure.

Turning to FIG. 7A, in some embodiments, an exemplary conceptual diagram showing the connectivity of local devices with local database to thin clients including but not limited to web-browser based clients, thin clients and mobile clients. The architectural setup may include a thin client 702 that connects to a cloud database 706 via DXM or a Transaction Manager 704. The thin client is the mobile or tablet application that hosts the network model including device connectivity and properties. Each thin client can synchronize its information with the cloud database. However, it may also maintain independent copies in each thin client for what-if simulation and individual editing. The transaction manager or DXCM/NetPM manager is the satellite link or postmaster in the cloud to other thin clients or desktop clients providing intelligent routing and message storing.

Figure 7B:
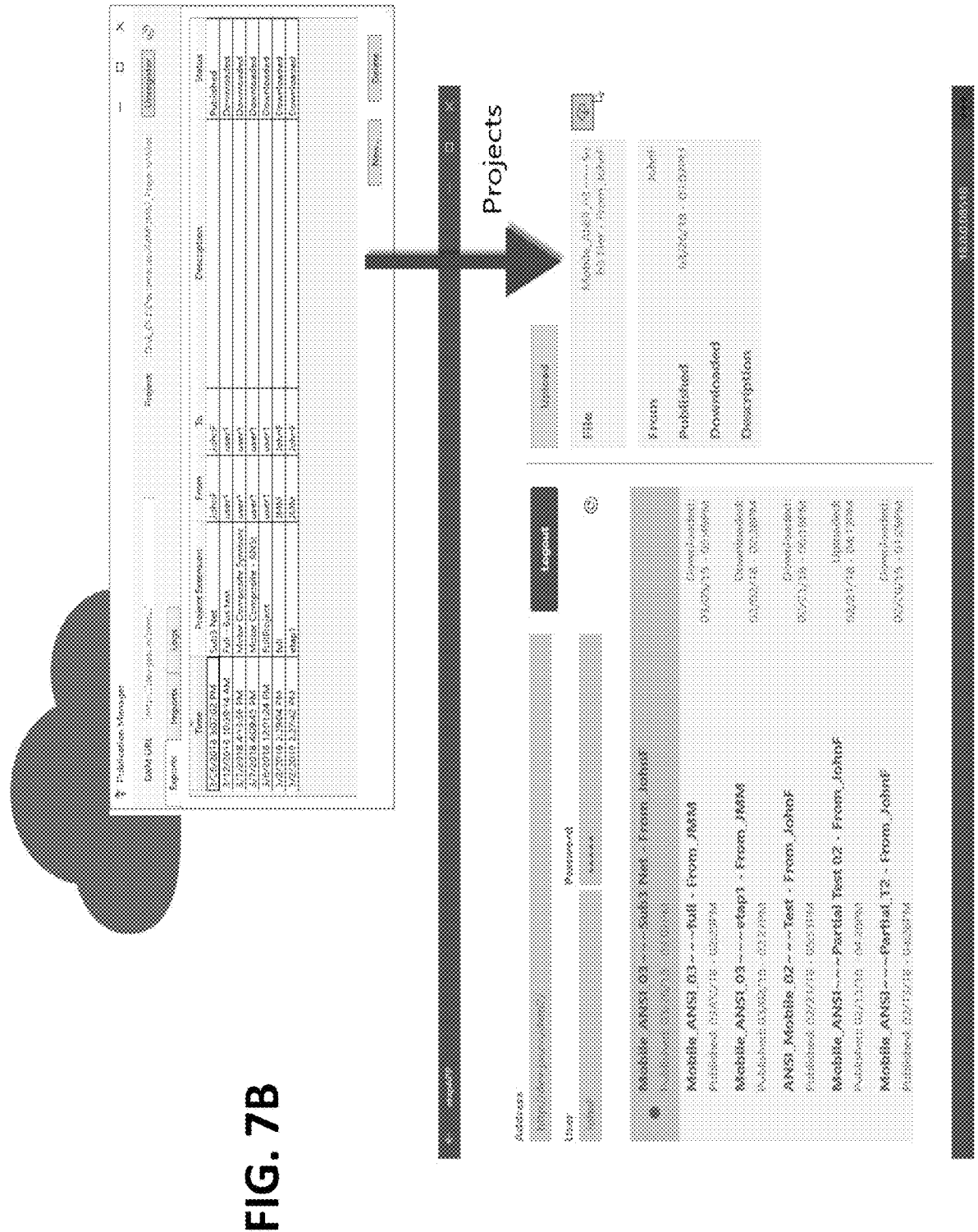
FIG. 7B illustrates an exemplary remote thin client utilizing a login page, according to some embodiments of the present disclosure.

FIG. 7B shows remote thin clients utilizing a login page that may require at least username and password to download the publication from, for example, Project A. In some embodiments, a cloud network storage or remote system address may be used in addition to the username and password. Remote thin client may include local storage information especially for mobile clients using a database storage system. FIG. 7B also shows the publication of Project A from the DXM available to remote mobile device also known as the download queue. In some embodiments, the system may maintain a copy of all published models downloaded from DXM as well as those uploaded to the DXM for utilization in the other client projects. Once data collection from the remote thin client is completed, the system may be used to upload changed or complete data to DXM in automatic or manual mode. User of Project A is notified that the publication has new changes for merging using the merge & sync wizard 840 as shown in FIG. 8C. Based on the automatic or manual mode of operation, the collected data from the remote thin client to Project A is displayed in a merge & synchronization table where automatic validation, data changes such as add/modify/delete may be flagged for the user. Automatic rules may be utilized by the merge & sync wizard to improve data quality prior to merge that includes but not limited to phase, voltage, field range checking, numerical precision, equipment type, manufacturer and model pairs and setting types. After merging, the local database or master database reflects the changes in the as-built network model, or the planning versions maintained for the as-built network model.

Figure 8A:
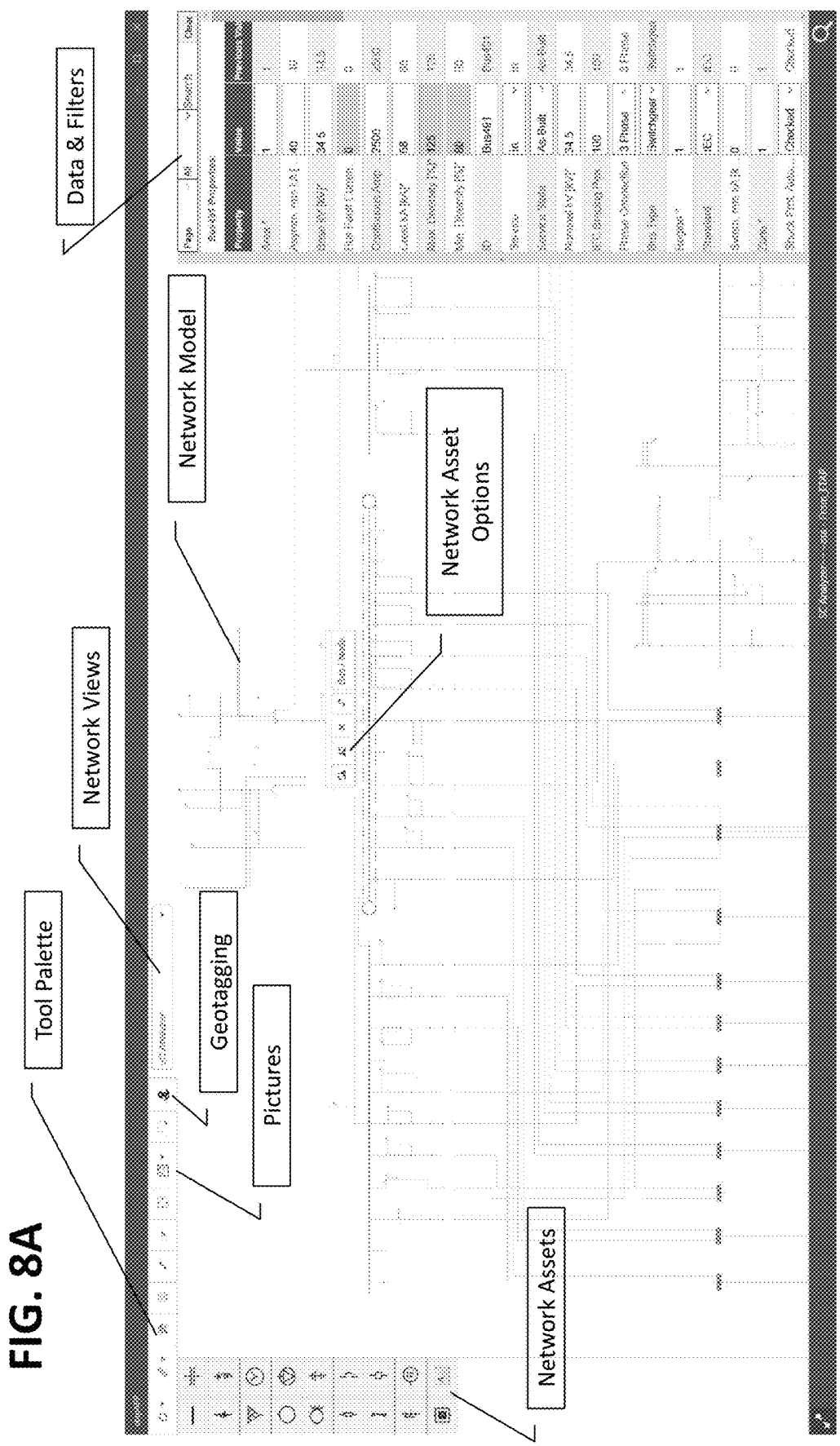
FIG. 8A illustrates an example software view of the model as it appears on a cross-platform thin client such as mobile, web or other thin client systems, according to some embodiments of the present disclosure.

FIG. 8A illustrates an exemplary embodiment of a thin client interface 810 using a cross-platform mobile client which will be used as an example for subsequent explanations. It may include a software view of the model as it appears on a cross-platform thin client such as mobile, web or other thin client systems. The mobile application may include a graphical user interface that may include network model visualization with views such as geospatial, schematic, electrical single-line, wiring diagrams, fluid flow, cross-sectional views, 3D views, layout views, street-views, process diagrams, protection views, trending charts utilized by engineering and operations. Each asset on the graphical view may be connected to an asset model with engineering and informational data displayed and organized in filterable tables, pivot grids, 3D flip menus, data grids and graphical information editors. A local cross-platform database for the remote client stores the asset model together with the connectivity of the asset model that makes up the entire network model. The network model may be an interconnected electric, water and gas model since the water and gas sources such as pumping stations are dependent on electricity from the electric stations.

Figure 8B:
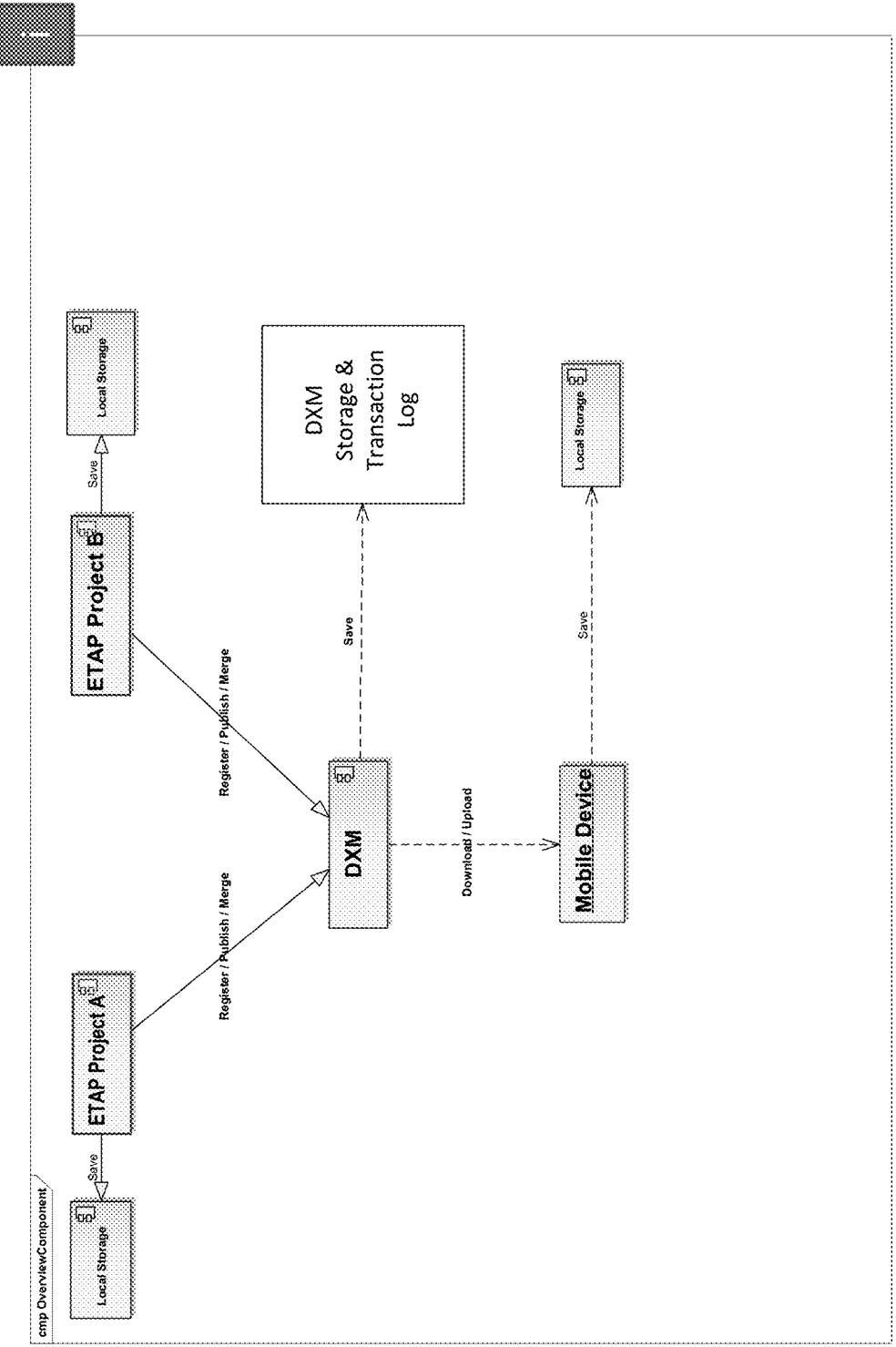
FIG. 8B(i) illustrates an exemplary overview architecture of a local project, DXM, and Mobile device, according to some embodiments of the present disclosure.
Figure 8C:
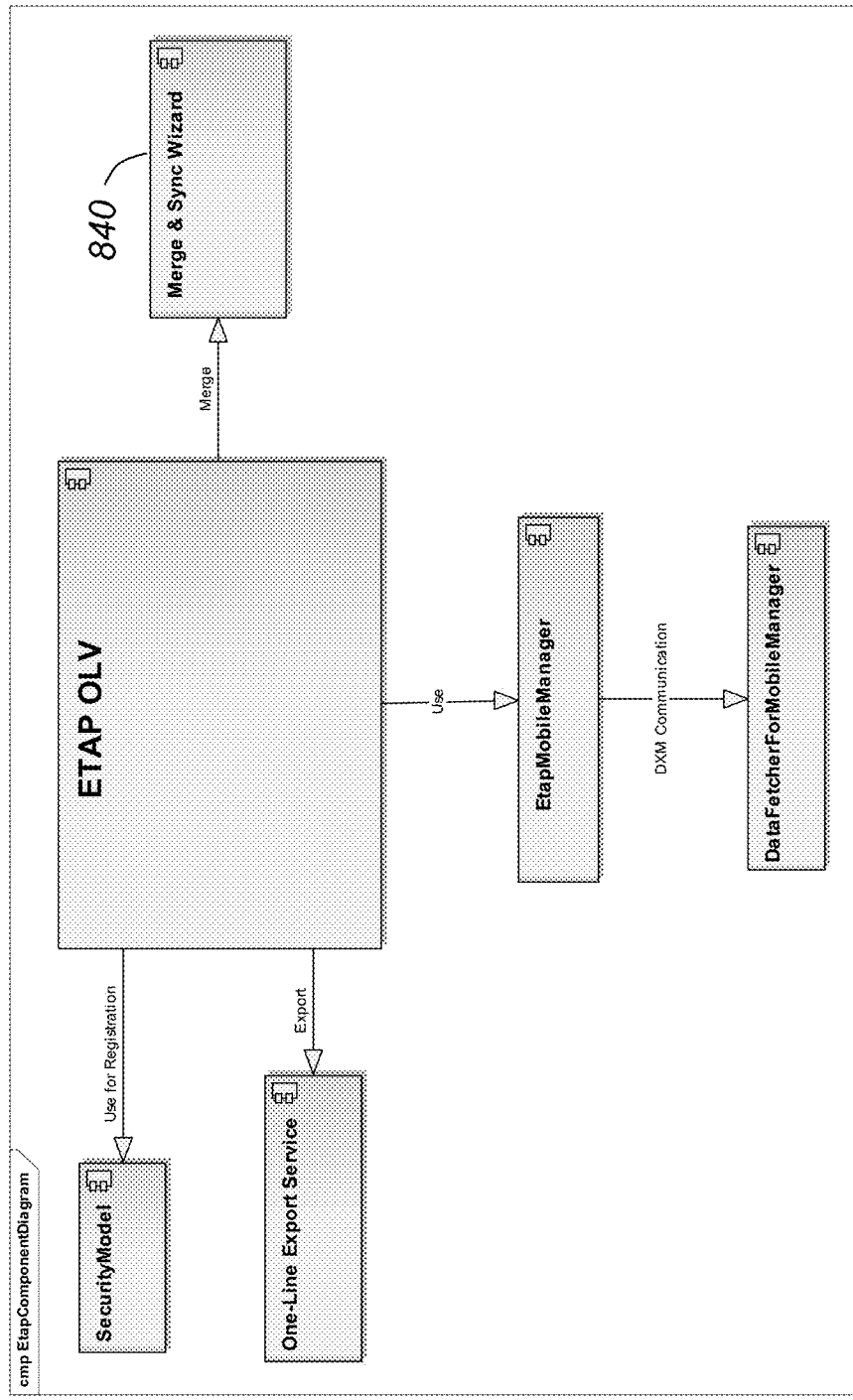
FIG. 8C illustrates desktop client connected to its own security model and to the DXM, according to some embodiments of the present disclosure.

FIG. 8B(i) shows an exemplary overview architecture of a local project, DXM, and Mobile device. Unlimited projects can connect to DXM to exchange project information. In some embodiments, project information may include network model, properties, connectivity, operating values, etc. Project A and Project B both have individual local storage such that all changes may be stored locally and transmitted to the DXM in an automatic or manual manner. The DXM may receive changes from multiple projects at the same time and organize the information from each project into respective DXM storage containers and maintain a transaction log. The Transaction log is a list of changes from each project, including change details, timestamp, nature of change, impact of change, owner of the change, change approver, action (add/modify/delete), etc. DXM may be hosted within the same computer, in a local area network, wide area network or at a remote server computer such as in a cloud service. DXM may allow for multiple Mobile Clients to be connected in parallel at the same time allowing for changes being made on the mobile device to be saved in the device local storage and then automatically or manually transferred back to the DXM. Therefore, the communication between the projects and the mobile clients is a bi-directional data exchange with the DXM additionally responsible for data validation, synchronization, error checking, data verification and transaction log management.

As shown in FIG. 8B(ii), a project may be registered with the DXM to be synchronized with other clients. It may include registering project information to DXM, authenticating, data exchange services, publication of the model from thin client and synchronization of changed data to the local database. In some embodiments, a project may be registered with more than one DXM at a time. The project is registered to a DXM using project information and security model. When the registration process is launched, a user authentication may be performed using the security model. This model may require knowledge including username, password, permissions, area of responsibility, access roles and access level. The security model verification process may determine via multiple authentication stages whether the system publishing the model has connectivity to the DXM, for example, whether the access verified by password methods may include facial recognition, biometric recognition methods, which part of the network does the access have to register based on area of responsibility, what information is the user allowed to publish, etc. Upon successful authentication with the security model, a Mobile Manager may be used to collect the user and password hash and store them into the security model for a limited period of user-configurable time, also known as timeout. This allows for signing into the same session without credentials for the limited period after which the session expires and the authentication must be performed again. The Mobile Manager may forward the project registration request and the project payload to a Data Fetcher which ultimately registers the project with the DXM and saves it to the DXM storage. In some embodiments, email notifications may follow successful registration and may be sent to all valid email addresses associated with registered users. The notification may include project registration status, DXM information, storage information and shared with list of project users.

Project registration information may include project name, global ID or GUID, username, email, list of project users, date of registration.

Similarly, a project can be unregistered from the DXM as shown in FIG. 8B(iii) where the project is removed from the DXM storage. In some embodiments, the process of unregistering a project may typically be initiated if the project collaborating has been completed or the DXM is being moved from one device to another. The project unregister request may be launched from the client, and upon authentication, forwarded to the Mobile Manager and Data Fetcher. The Data Fetcher may be responsible for unregistering the project for all clients, removal of the project information, transaction logs, unsubscribing client devices and removal of all confidential information such as authentication information.

Figure 10:
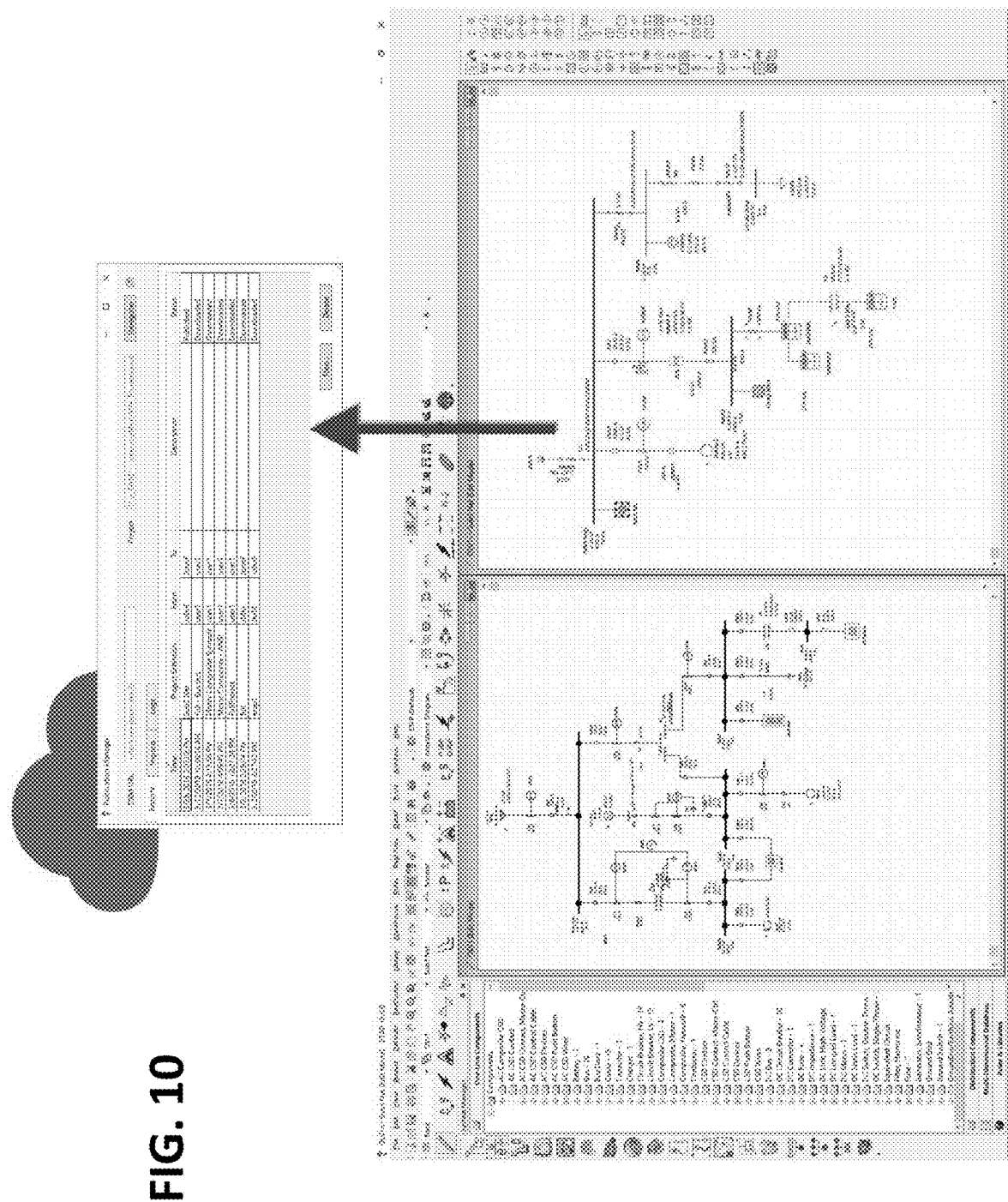

As shown in FIG. 8C, the ETAP desktop client may be connected to its own security model and to the DXM. The ETAP system can be used to identify and group assets from the complete or partial project by graphical or other collection means to publish shared assets to the DXM via the Export Service. The export service may publish the asset information to the DXM via the Mobile Manager and Data Fetcher interfaces. Once the assets are published and stored in the DXM, they may be utilized by the remote thin client platforms, using export service shown in FIG. 8C and the interfaces as shown in FIG. 10. Every call to the DXM may be logged in the Transaction Log within the DXM storage. Each entry in this log may contain information including Date/Time, Transaction Type, Register Project, Publish Project Subsection, Request User Login, Request Project Subsection List, Request Project Subsection, Upload Changes, Request Merge, Merge Acknowledgement, Source IP, Source User, Destination User, Project Extension, Classification, Description. Information from the remote thin clients is received by the DXM and processed by the Data Fetcher and Mobile Manager interfaces. ETAP desktop client may utilize a local Merge & Sync Wizard that identifies the retrieved information with add, modify or delete categories and can automatically or manually synchronize the changes with the desktop model.

As shown in FIG. 8D(1), various exemplary services have been included with the Mobile Client, for example, Graphical User Interface (View), View Model, Business Logic Access service (Model), Local Storage service, Navigation Service, Dialog or User Interface Service, Web API for data exchange and hardware layer access including but not limited to camera access service, gyro access service, biometric recognition access service, payment access service, microphone access service, augmented reality access service, holographic display access service, inking and touch screen access service, just to name a few. The View Model may act as an intermediary between the View and the Model and is responsible for handling the presentation logic. The View encapsulates the user interface, interface logic, animations, transitions, visual elements including a window, page, user control, graphical control, map, 3D rendering or data template. The View's responsibility may include defining the structure and appearance of what the user sees on the screen to include visual behavior to manipulate elements including XAML. The controls in the View are data bound to the properties and commands exposed by the View Model. The Model encapsulates business logic and data regarding the assets. Business logic is defined as any application logic that is concerned with the retrieval and management of application data and for making sure that any business rules that ensure data consistency and validity are imposed. The View interacts with the View Model through data binding, commands, and change notification events. The View Model queries, observes, and coordinates updates to the Model, converting, validating, and aggregating data as necessary for display in the View. Therefore, the View Model is where information required from the Model (or from multiple models) is retrieved and transformed to a format that the View understands or may be easily consumed by the View. The View and the View Model are linked by an observer pattern in such a way that the View reacts to a property notification signals sent by the View Model. Similarly, the View Model responds to signals from the model in an observer structure. The View Model subscribes to the Model and the View subscribes to the View Model. The view triggers procedures and accesses properties of the View Model and, similarly, the View Model accesses functions, methods and properties in the Model.

In some embodiments, the thin client interface may include a tool palette, nested or multiple diagram canvas for visualization of, for example, one-line diagram, geospatial diagram, human-machine interface (HMI) dashboards, underground assets, underground cross-sectional piping and cable views, 3D views, logical and wiring diagrams. Components can be added using drag and drop, speech recognition, ink to graphics, real-time communication/plug and play devices or augmented reality input. The tool palette may be used to control many features of the thin client for the complete network model or for selected assets (single or multiple) including ability to attach pictures, record audio, utilize inking services, geospatial tagging, background geospatial maps, augmented reality, 3D network visualization via holographic screens, perform analytical functions on local hardware, access analytical results from remote hardware, image recognition and nested views. Asset can be tapped to select, double-tapped to bring up a context menu, press and hold to bring up alternative right click menu with advanced functions and for certain supported devices, press and hold firmly to utilize 3D touch to bring alternative advanced menu.

FIG. 8D(2) shows an exemplary embodiment where a network asset may be selected to display the engineering properties associated with that asset. Selection of a single asset displays its individual information while selecting multiple assets shows the common information of a key or anchored asset. This anchored asset is highlighted sufficiently from the rest of the selection and the anchor point may be changed. The engineering asset is shown in the property sheet that includes filters for equipment page as it appears in the master model or based on keyword search of an engineering property. The property sheet also shows the existing value for the engineering asset together with one or more versions of the historical values. These historical values are retained and retrieved from the local storage on the device. Historical or previous values can be used to replace current information. If more than one similar component type is selected, the information may be displayed in property sheet with the common information only. If more than one dissimilar component type is selected, the information may not be displayed in a property sheet and therefore available in tabular manner. The table column layout can be customized based on datablock selection which are configured and also utilized on the desktop client. The tabular view can be filtered, sorted, color coded and conditional formatting can be applied to easily find the relevant data. Further, tapping on a row selects the row, double-tap on the row minimizes the table and highlights the device on the diagram; press and hold provides access to a context menu that includes functions like row height, color style, lock.

Figure 8E:
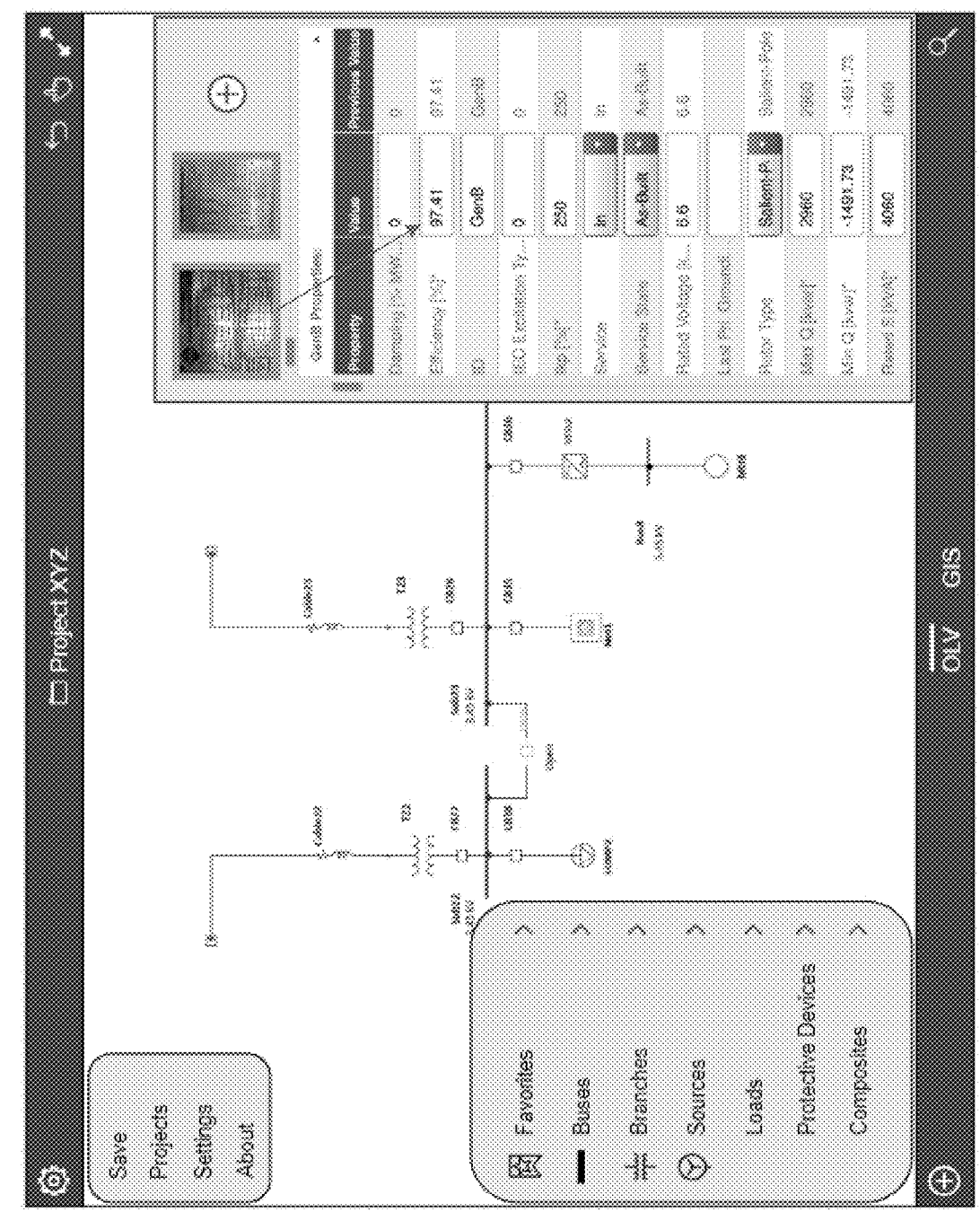
FIG. 8E illustrates an exemplary embodiment where individual network asset is selected, and camera access service called, according to some embodiments of the present disclosure.

FIG. 8E shows an exemplary embodiment where individual network assets are selected, and camera access service may be called to take pictures of the asset. The asset information is then tagged with the picture and displayed in the property sheet or when the network asset is touched as controlled by the mobile client options. In some embodiments, the asset picture can be processed through an image recognition function, e.g., of the mobile application, to recognize equipment information from equipment ratings using, for example optical character recognition (OCR) technology.

Figure 8F:
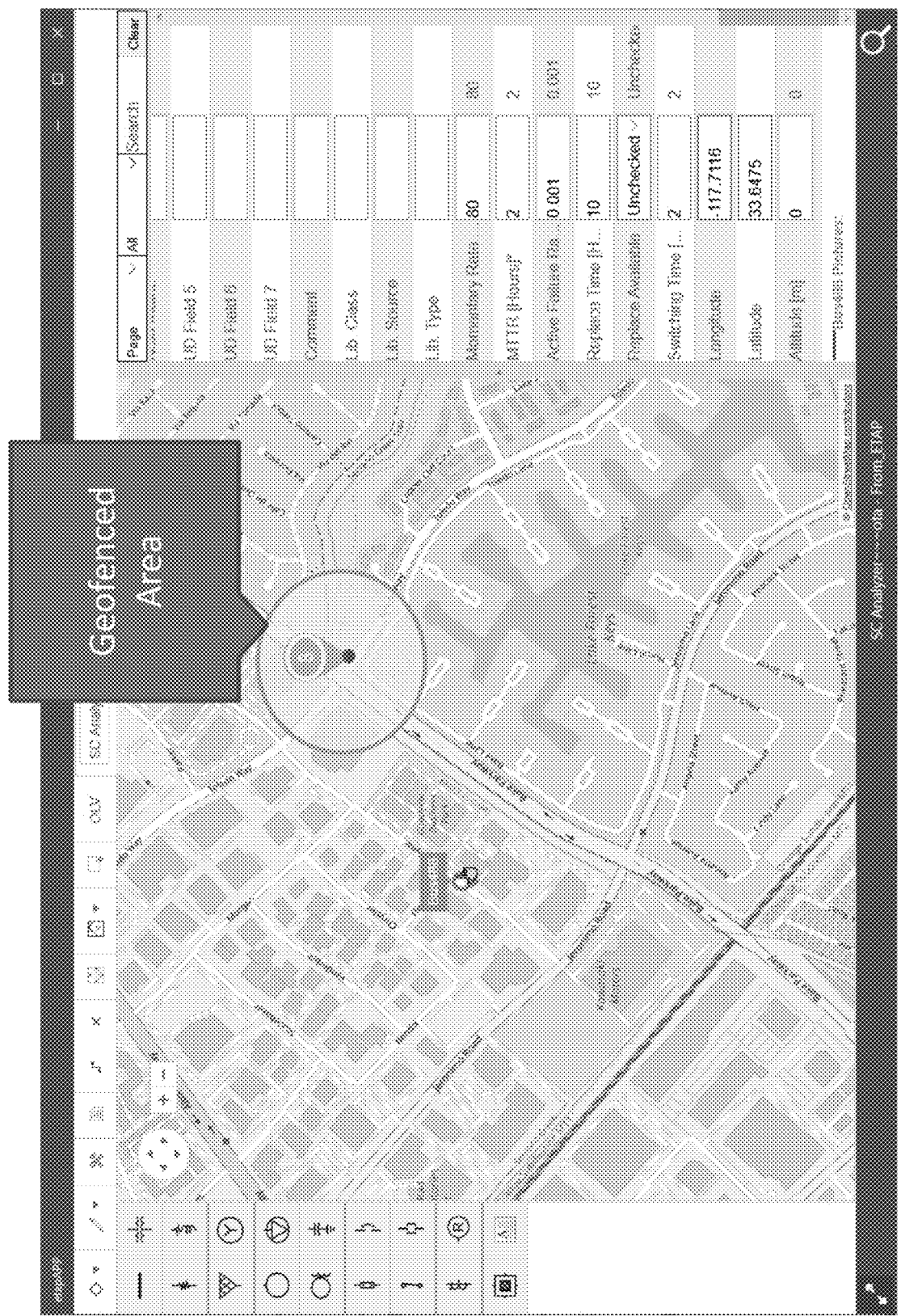
FIG. 8F illustrates an exemplary embodiment where individual network asset is selected, and navigation service accessed, according to some embodiments of the present disclosure.

FIG. 8F shows an exemplary embodiment where the individual network asset may be selected, and navigation service may be accessed in order to geotag the asset. This populates the latitude and longitude information as shown in the figure along with a pin location of the asset and relevant information regarding the asset on a tooltip. Zoom-in and zoom-out automatically triggers a dynamic de-cluttering routine that groups the asset and shows them with a group number. Upon zooming in the individual asset pin is resolved, upon zooming out the individual asset pins are collapsed and dynamically numbered. A geospatial view with electrical, water, gas, and additional layers may be available via a geographic information system (GIS) model including map overlaps based on map service providers such as Google, Bing or OpenStreetMap, ESRI and others.

In some embodiments, the mobile client may be in mixed mode as activated from the tool palette, for example data collection mode of data identification mode. Once linked to GIS information in the system, for example, as the user walks through a substation, he can automatically retrieve complete asset information about the object being viewed. Based on the geospatial coordinates, the system can automatically display relevant equipment information when the mobile device is in physical proximity to the asset and show its GPS location on the geospatial view, for example by polyline geo-fencing around the asset. If any individual or system enters the geo-fenced location, alerts can be configured to automatically notify operations to understand whether the entry into the close vicinity is authorized or not. The device is also able to extract GPS coordinates from the pictures linked to the asset or automatically mark the device with a GPS tag through location proximity or manual entry.

Figure 8G:
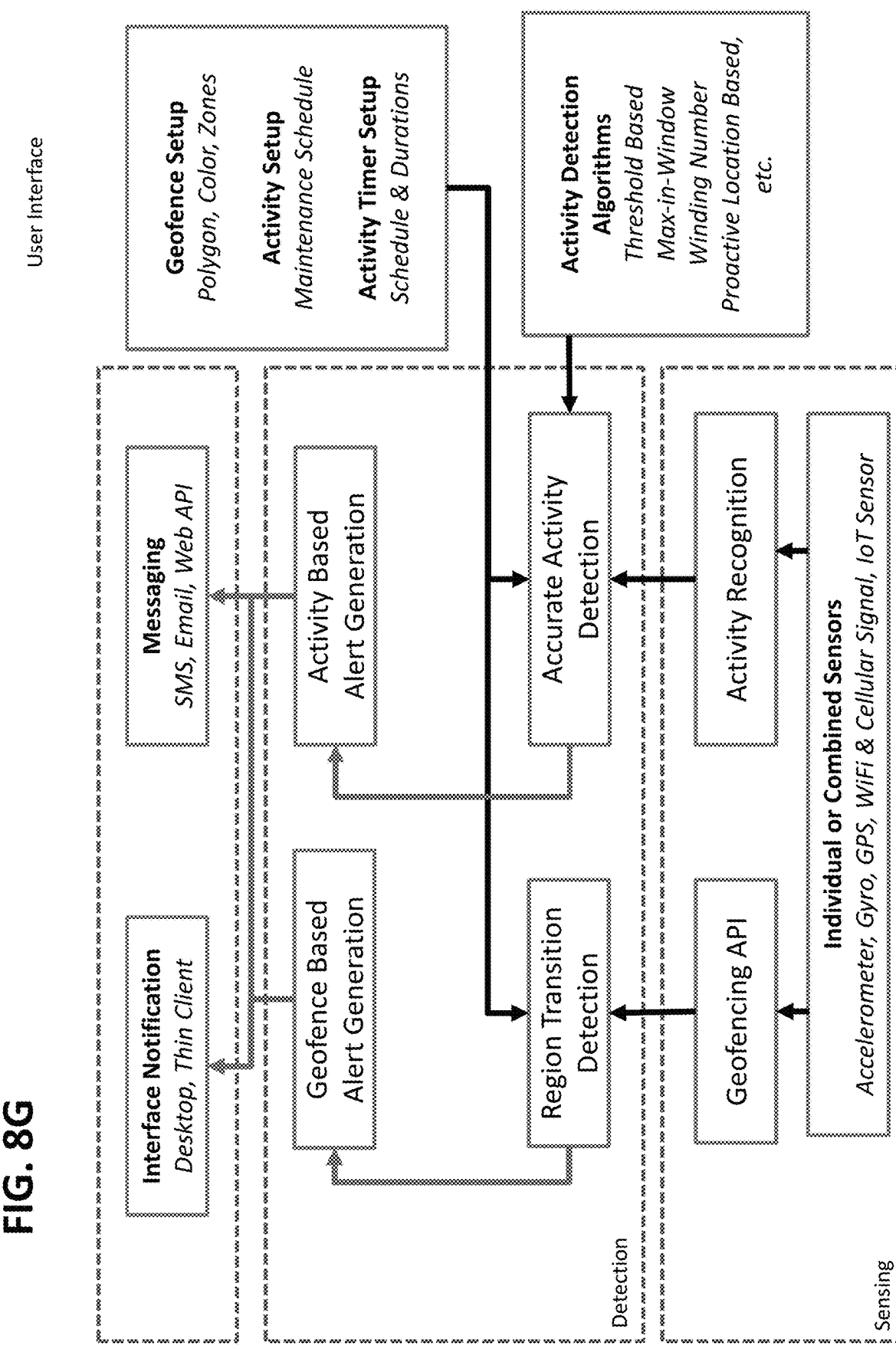
FIG. 8G illustrates various exemplary services and components of a mobile or client device, according to some embodiments of the present disclosure.

FIG. 8G shows various exemplary services and components of a mobile or client device that provide the GIS detection and alert notification. In some embodiments, sensors (e.g., accelerometer, yyro, GPS, WiFi & Cellular Signal, IoT sensor) may provide input to a geofencing API and activity recognition interface. The inputs are processed by various geofencing and activity components and alerts may be generated as needed.

Figure 8H:
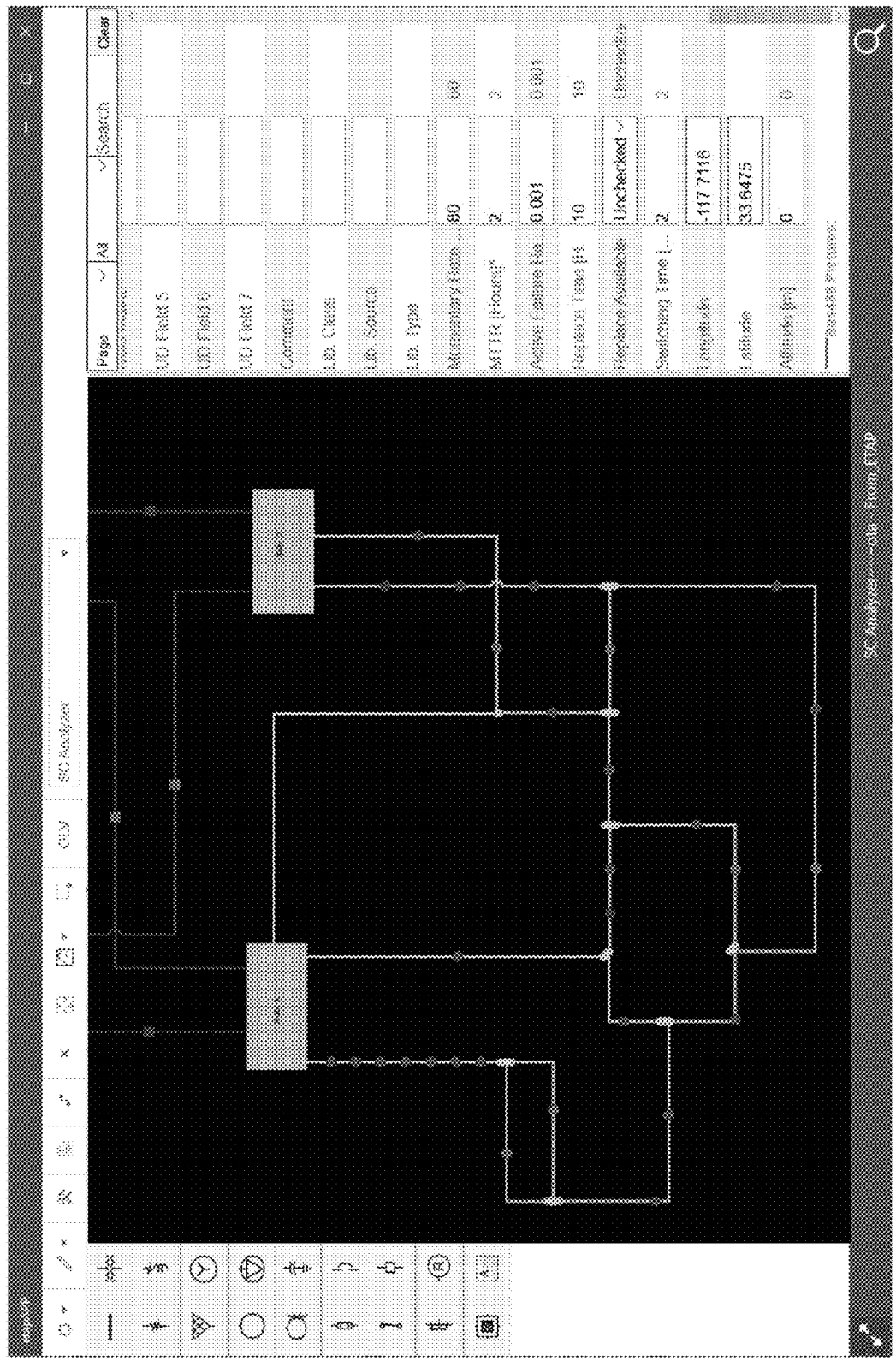
FIG. 8H illustrates exemplary network view interface, according to some embodiments of the present disclosure.

FIG. 8H shows an exemplary network view 880, illustrating the ability of the system to also display network views (called NetViews) where the connectivity details from one power, water or gas distribution station may be simplified for the engineer or operator to view the open and close points between these main feeding stations regardless of voltage, consumption or capacity levels.

Figure 8I:
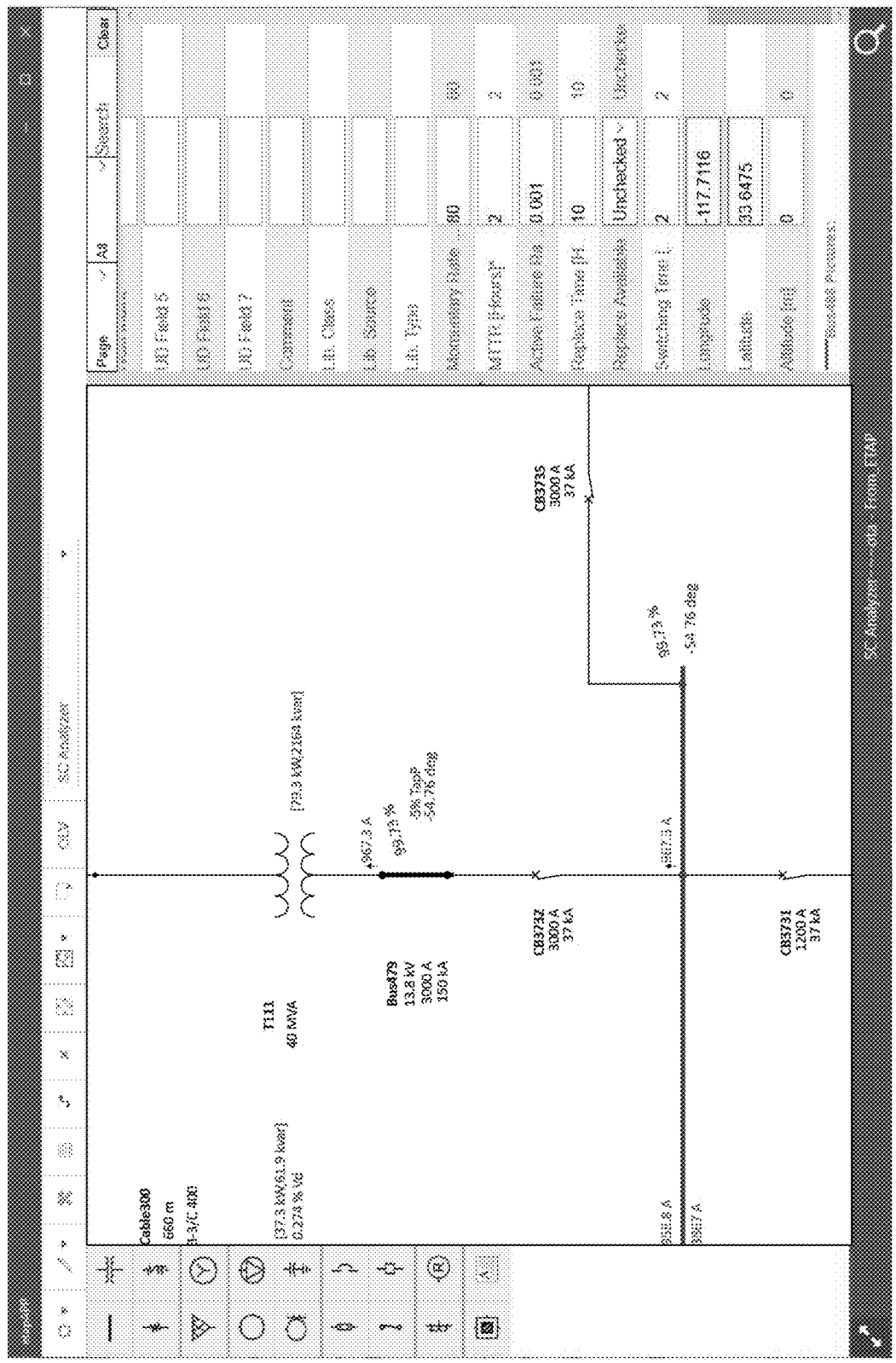
FIG. 8I illustrates exemplary network simulation, according to some embodiments of the present disclosure.

FIG. 8I shows an exemplary embodiment 886 where the network simulation triggered as shown in FIG. 2B is used to display results directly on the diagram canvas using for example using numerical values, color contouring, animated values, pie charts, bar charts and line charts for time series information.

In some embodiments, network assets including electrical, water and gas may be added to the diagram using multiple options. Touch, Inking, Speech Recognition, Image Recognition, QR codes, RFID, bar codes and similar systems are also provided or supported to identify assets and build network connectivity.

Figure 8K:
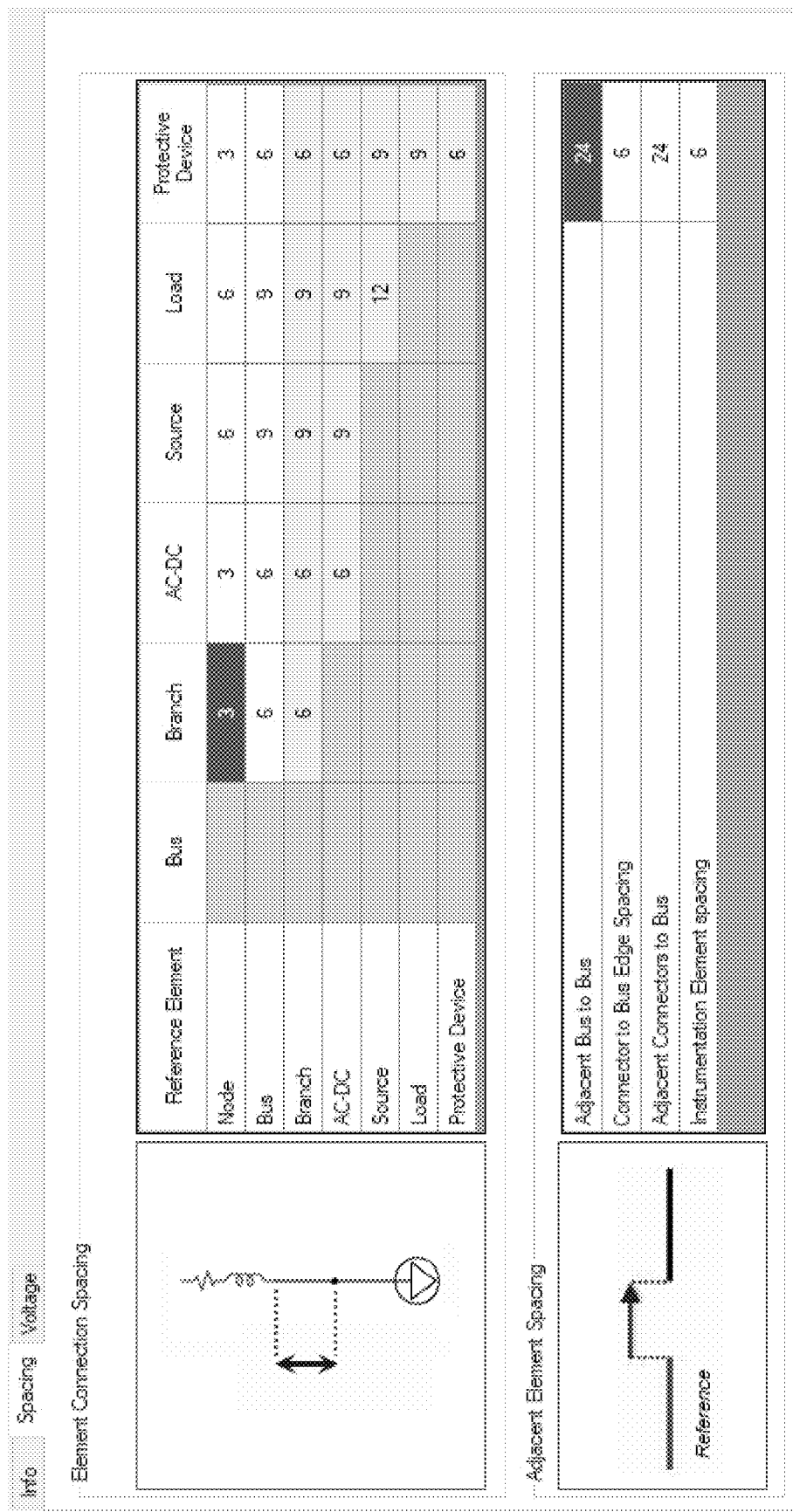
FIG. 8K illustrates exemplary intelligent engineering rules, according to some embodiments of the present disclosure.

Touch Method—FIGS. 8J(1) to 8J(3) show an exemplary embodiment 890 where touch screen input may be used to add an object based on pre-defined engineering rules. The element or component tool palette may be tapped/touched to be added called source element. The source element is to be added to a target element. The target element is touched, and a visual indication is shown whether the source element may be connected to the target based on engineering rules. For example, a motor may be connected to a circuit breaker however a protection relay cannot be directly connected to a breaker without utilizing a current transformer. These intelligent engineering rules include automatic spacing between elements prior to connection; an example of these rules is shown in FIG. 8K. Auto-build rules and auto connect logic is used to ensure rules are enforced for component connectivity, engineering codes, equipment spacing, sizing, layout and cognitive connections.

Figure 8L:
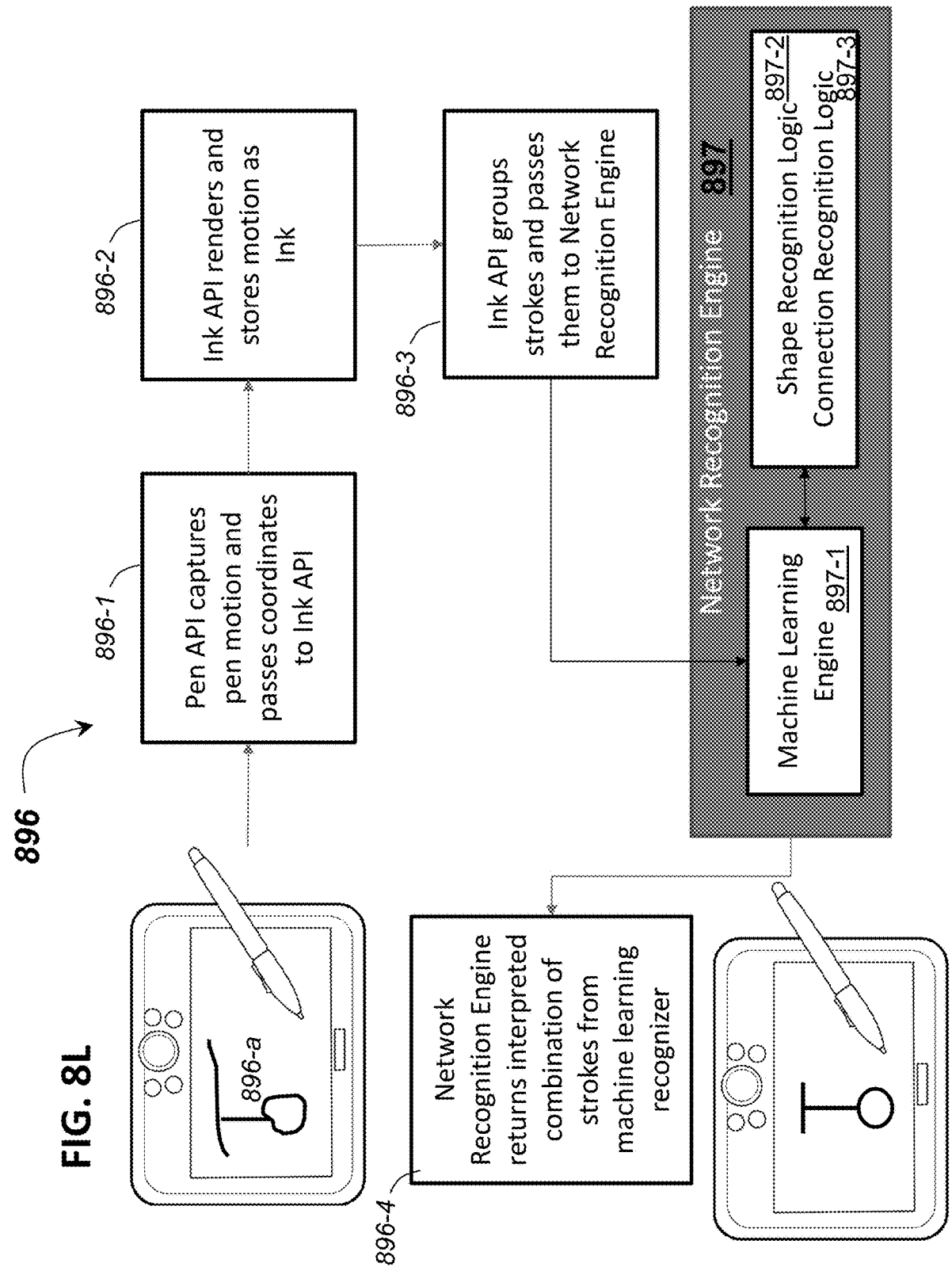
FIG. 8L illustrates an exemplary high-level diagram of process for building a network model using inking capability, according to some embodiments of the present disclosure.

Inking Method—FIG. 8L shows an exemplary high-level diagram of process 960 for building a network model using inking capability, for example utilizing mouse, pen, stylus, gestures, to draw or handwrite information 896-a that is converted into built-in equipment symbology, text and network connectivity. The writing surface may be the diagram where the system is used to interpret the drawing from various inking devices into contextual information. At 896-1, a pen API may capture the pen motion and pass the coordinates to the ink API. At 896-2, the ink API may render and store the motion as ink. At 896-3, the ink API may group the strokes and pass them to a network recognition engine 897. At 896-4, the network recognition engine 897 may return interpreted combination of strokes from a recognizer which may be a machine learning engine 897-1. In some embodiments, the system may have knowledge of all practical electrical, gas and water component shapes and may be able to recognize with standard inking or handwriting and this information is stored in the Shape Recognition Logic 897-2. When the machine learning engine is not able to recognize or has multiple hits, it may prompt the user to choose between the component options for the engine to learn a new shape and to recognize a new handwriting. For example, a circle may represent a motor, but it may be an induction motor or synchronous motor, but a circle may also be just a circle. The machine learning engine therefore may also utilize element connectivity as described in an Auto-Connect logic or a Connection Recognition Logic 897-3 regarding which elements are allowed to connect with each other to further interpret the inked shape to a network component.

Figure 8M:
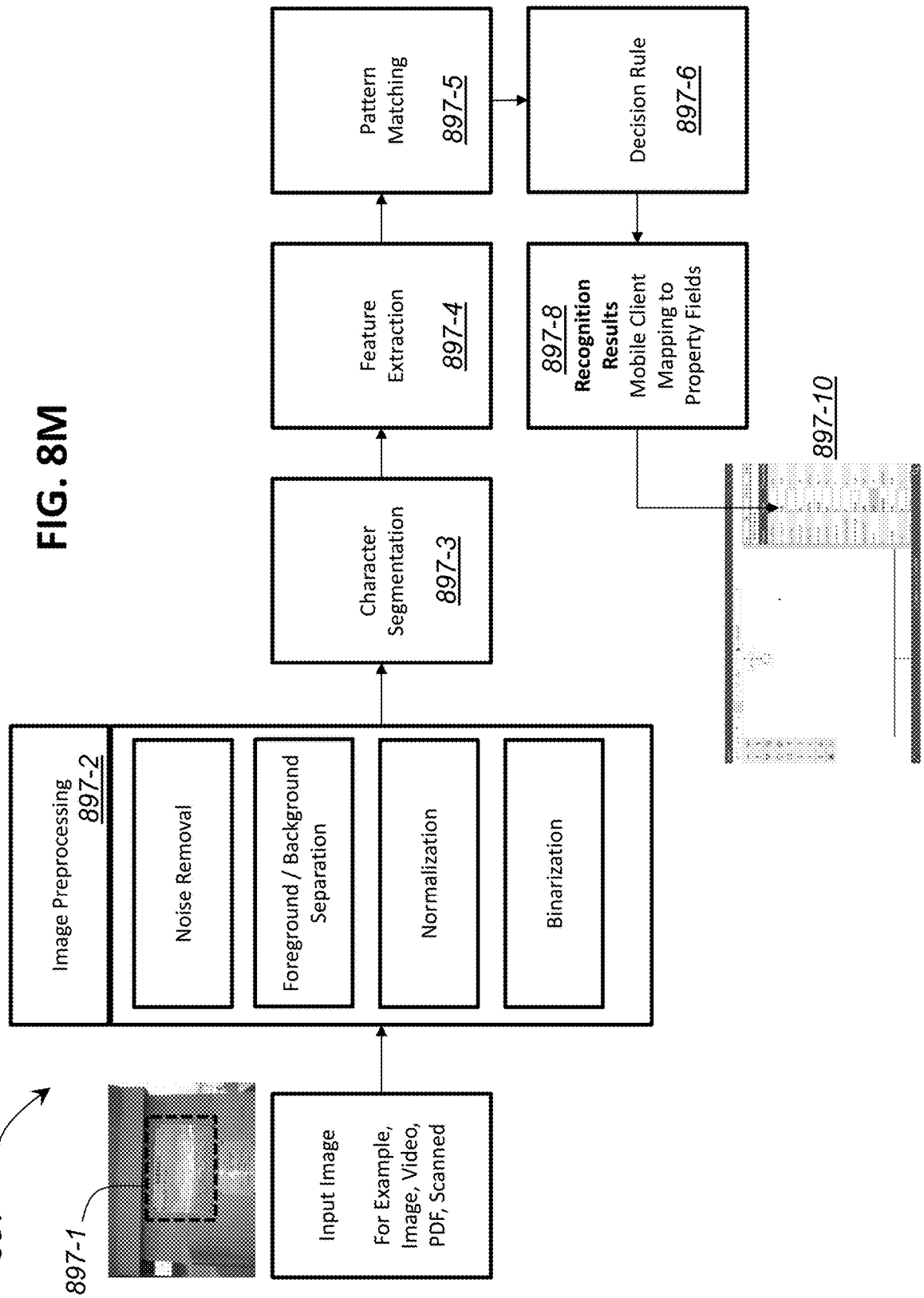
FIG. 8M illustrates an exemplary high-level diagram of a process for building the network model utilizing visual media, according to some embodiments of the present disclosure.

Image Recognition—FIG. 8M shows an exemplary high-level diagram of a process 897 for building the network model utilizing visual media, for example direct camera input, images, video, scanned drawings in PDF, CAD or similar format. In this mode, for example if direct camera is used FIG. 8M shows the camera input into the mobile client with an overlay of an acquisition window 897-1. The image must be positioned into the acquisition window in order to get enough zoom and clarity. Once the image is within the acquisition window, image preprocessing 897-2 is used to continuously determine the boundary of the equipment nameplate with respect to the equipment frame and to notify when the image has been acquired for data extraction. Image processing may begin with noise removal especially in low light conditions and the image is then passed to the foreground/background separation logic. The separation logic may utilize contrasting colors to determine for example the foreground, background, nameplate boundary and equipment frame to determine whether the image is sufficiently within the frame and captures, stores and begins the process of data extraction. The image may be normalized in terms of lighting and then converted into binary information for storage and further feature extraction. The nameplate information may include symbols and alphanumeric values that are interpreted, recognized and correctly mapped to the mobile client input fields for review and further processing. The process may require a character segmentation 897-3 to separate the values from the units followed by feature extraction 897-4 to determine the alphanumeric content of the values and units. For example, if the motor rating is 100 HP then 100 and HP are separated using character segmentation and the feature extraction followed by the pattern matching 897-5 and decision rule 897-6 may determine that the rating of the machine is 100 and its unit is horsepower. The recognition results 897-8 may be sent to a mapping table 897-10 that interprets 100 horsepower as the unit of the machine power rating and stores the value into the appropriate data field for review and validation.

Figure 8N:
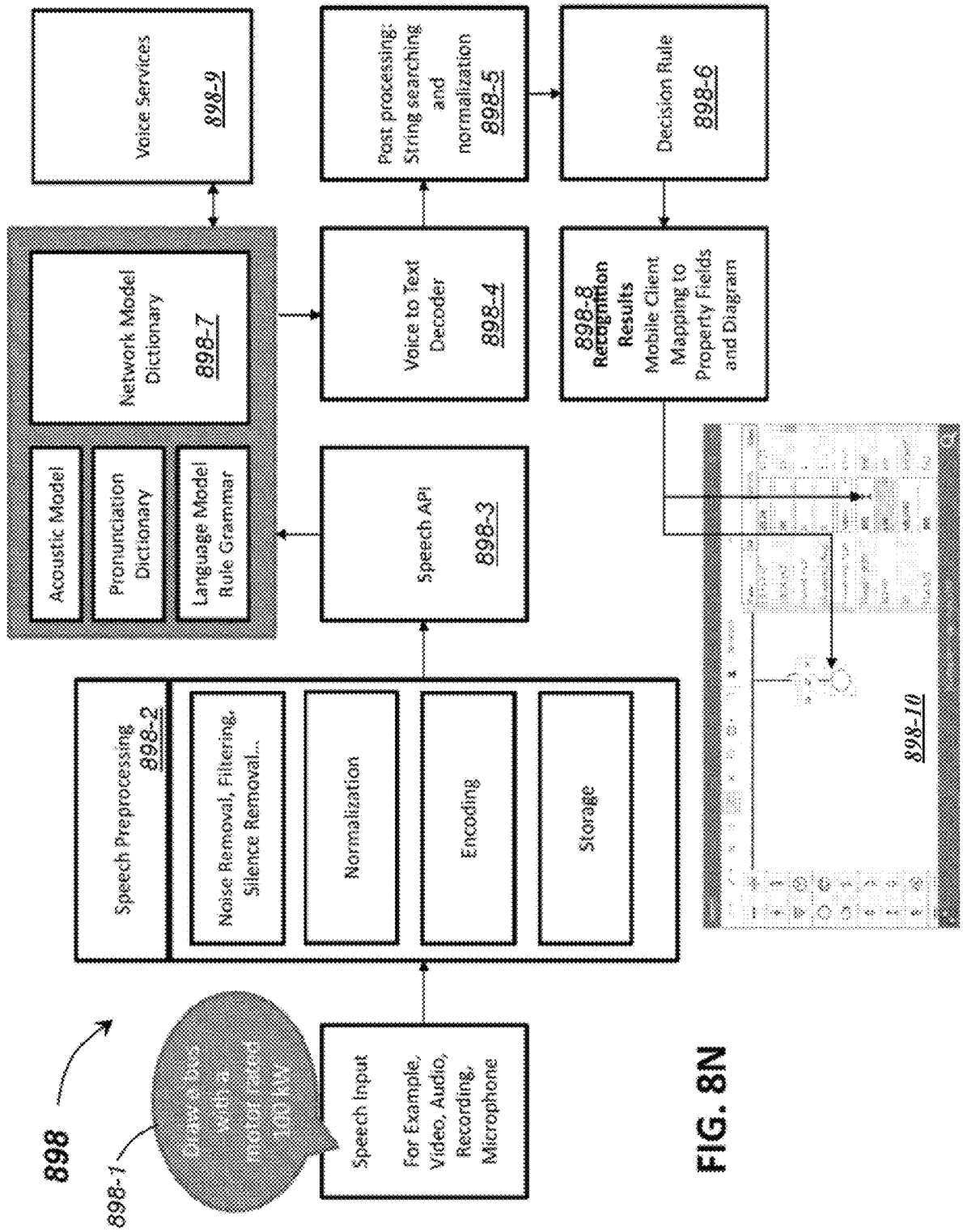
FIG. 8N illustrates an exemplary high-level diagram of a process for building the network model via speech recognition, according to some embodiments of the present disclosure.
Figure 80:
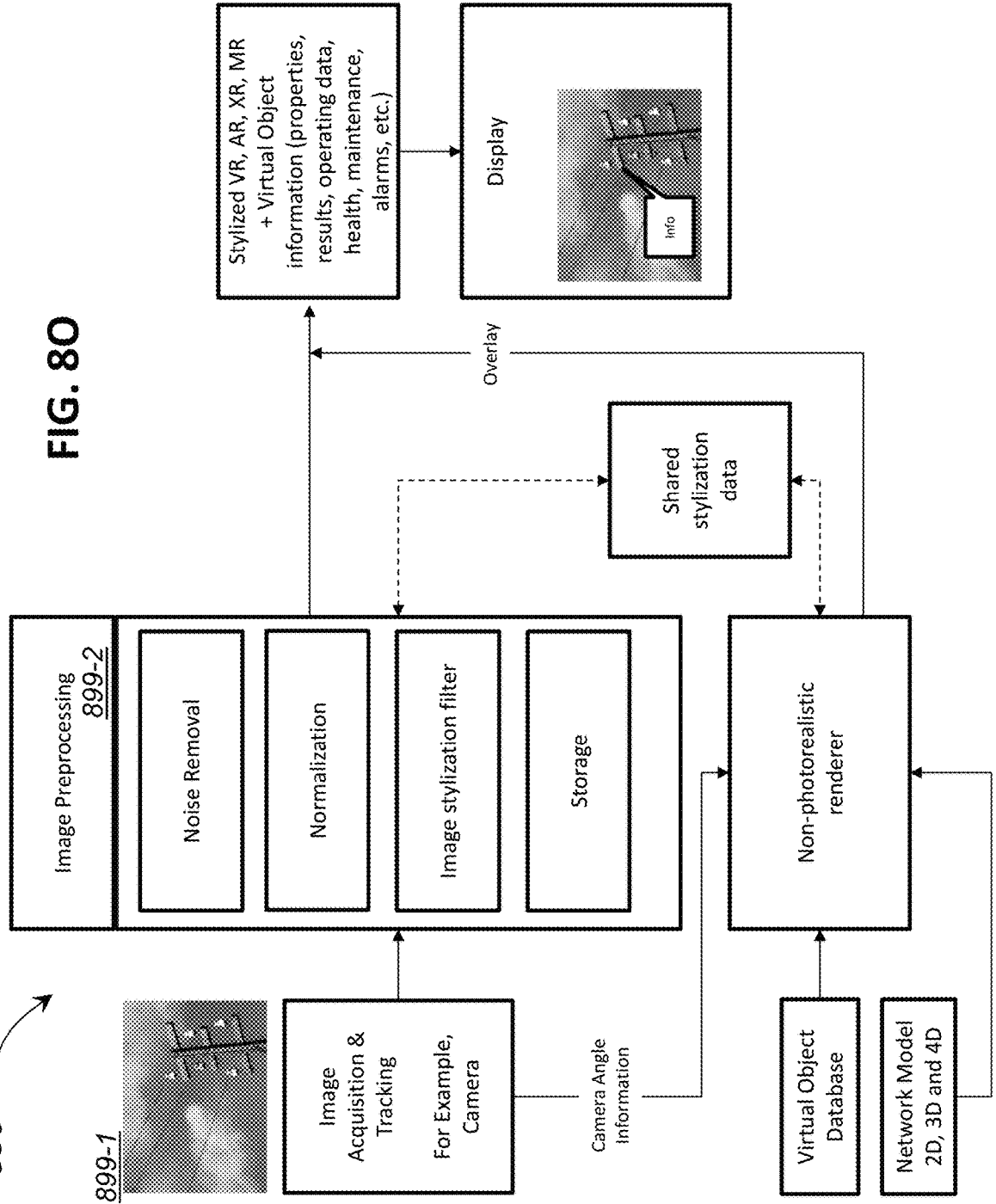

Speech Recognition—FIG. 8N shows an exemplary high-level diagram of a process 898 for building the network model via speech recognition. The system accepts input 898-1 using for example video with audio, audio only, recordings or direct microphone input similar to dictation. The audio information is passed through a speech preprocessing logic 898-2 that may include noise removal, audio filtering, silence removal and audio level normalization in order to improve audio clarity and it is then encoded to be stored in the local device for further processing. A Speech API 898-3 is utilized to compare the recording against a previously trained acoustic model where certain words with their acoustic signature were previously recorded and stored. This acts as the knowledgebase where the pronunciation from the recording is compared against the stored acoustic model to understand the pronunciation and further process through a language model that consists of evaluating the words being spoken along with their grammar rules. The words are available in a format that can be used to compare with a specialized network model dictionary 898-7 where the frame of certain words in a sentence is used to recognize the intent of the speech. For example, if the speech states draw a bus with a motor rated 100 kW then the audio is split into actions—draw a bus, connect a motor to that bus, the motor should be 100 kW rating. This intelligence is provided by the network model dictionary 898-7 which can be further augmented using voice services 898-9 provided for example by Cortana, Siri, Alexa. The actions are then converted into internal actions to be applied to the mobile client in formats including for example JSON, text, Python. The actions are interpreted through post processing 898-5, which is coupled to the voice-to-text decoder 898-4 and may include a string search and normalization. Post processing 898-5 is coupled to the block for decision rules 898-6. Post processing 898-5 and decision rules 898-6 are utilized to apply the actions to the diagram or engineering data. The decision to draw the objects and change engineering data is passed to the mobile client interface. Recognition results 898-8 provides for a mobile client mapping to property fields and diagram 898-10.

Extended Reality Applications:

In some embodiments, the system may provide virtual reality (VR that includes fully artificial environment), extended reality, (XR) augmented reality (AR where virtual objects are overlaid on real-world environment), desktop VR, Immersive VR, Video Mapping VR, Distributed VR, Telepresence and mixed reality (MR where virtual environment is combined with the real world) to combine network model information, analysis results (descriptive, diagnostic, predictive, prescriptive), operating values and system health condition in order to present comprehensive asset and system information.

FIG. 8O shows an exemplary high-level diagram of a process 899 where the image acquisition may be from an external camera or built-in camera of the mobile device that includes image tracking capability in order to lock on to an image and identify the targeted image in a visual manner. The camera angle may be continuously provided to a non-photorealistic render that identifies the object being targeted. For example, if a wooden pole with overhead wires (at 899-1) is targeted with the camera, the image pre-processing will be used to compare the object style with the virtual object database in order to correctly identify the type of object being targeted. Once the object is targeted, other information or combination of information, for example GPS coordinates, nameplate information, QR code, RFID may be used to identify the object in the network model database. Once the object has been identified, pre-configured information is displayed about the object in multiple manners. In some embodiments, the information may be overlaid on the camera display. In some embodiments, the system may displace non-photorealistic rendering next to the object with a template driven pre-configured information. In some embodiments, the system may display a border around the object with the template driven pre-configured information regarding the object. In some embodiments, the system may display holographic information on the mobile client and with template driven pre-configured information regarding the object. Information that may be pre-configured may include but not limited to identifier, connectivity, rating, phase information, voltage information, routing, maintenance history, health index, remaining lifetime, maintenance due date, analysis result from 'what-if' scenario, information for invisible or hidden objects within a targeted object, part numbers and service procedures.

Figure 8P:
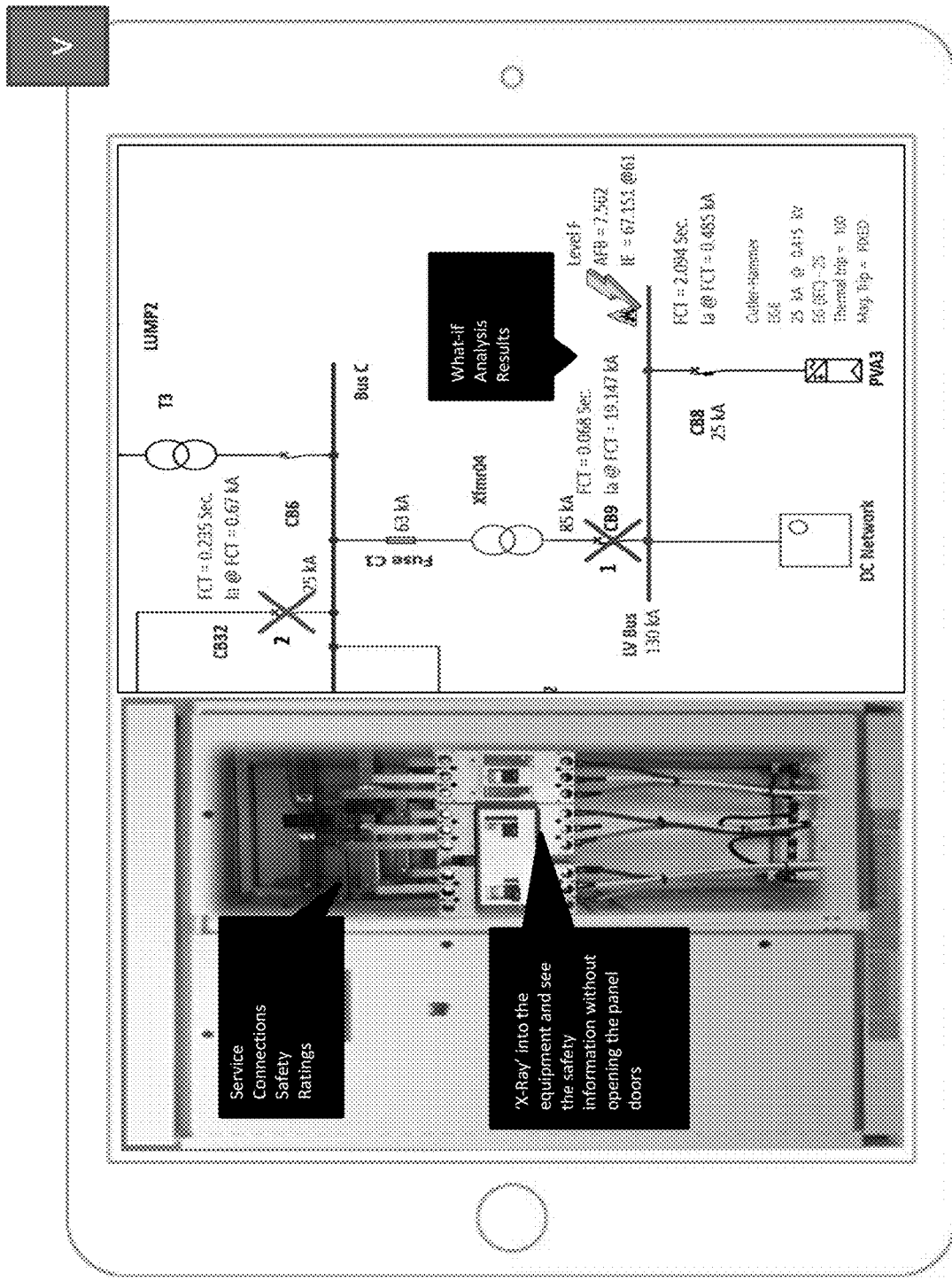
FIGS. 8P(i) and 8P(ii) illustrate exemplary views with image acquisition, according to some embodiments of the present disclosure.

FIG. 8P(i) shows an exemplary camera image with template driven pre-configured information displayed by overlaying the information directly on the targeted or tracked image from the camera. The information, for example for a wooden pole with overhead wire may include the line code, line unique identifier phase information, voltage information, power frequency, power quality/harmonics, line sag, distance to nearest pole, line rating, ground wire information, operating current, ambient conditions, insulator type and rating, insulator and pole maintenance dates, remaining lifetime or health index, pole unique identifier, pole height and type, maintenance crew ease of access, elevation of the pole, cross arm distances between phases, information as function of time, etc. Information as function of time may be obtained from the network model that includes planning information over multiple periods such as the in-service and out of service date of the asset being targeted. A time slider can be used to select the data range and advance either the planning data for the object by a pre-defined time step. For example, if the pole is to be replaced with a concrete pole next year then a virtual object may replace the existing image showing that the pole has been upgraded to a concrete pole with new insulators, rating and wire separations. The time slider can be used to also go backwards in time to review the historical data of the line, for example, the sag, temperature, outages, current and rating violations can be displayed in augmented reality overlaid on the target image. Time slider can also be used for replaying the information from a start date to end date to review the planning data and operating data changes as function of time. The time slider can also provide the ability to retrieve recordings made by maintenance crew or nearby tagged cameras that show recorded information about the activities around that object between the selected time periods. The compass 899-20 shows the orientation of the camera in 3D space using a magnetometer and inclinometer hardware from the mobile client. Inspection fields for reviewing the condition and health of an asset and tracking its maintenance history along with historical timeline of pictures to show degradation of the device.

Another exemplary embodiment is shown in FIG. 8P(ii) where the camera tracking shows objects based on the GPS location that are not possible to directly acquire such as underground pipes. Information for buried or non-visible objects can include code, identifier, material, routing information, connection information, distance to object, length, contents, operating values for power, water flow, gas flow, etc.

FIG. 8P(iii) shows an exemplary mixed view embodiment including virtual object with connectivity and augmented object with non-photorealistic rendering combined with operating and static information. The static information may be displayed on the non-photorealistic rendering. For example, power transformer information can include identifier, rating, cooling class, tap changer limits, voltage rating for various windings, protection information, installation date, bank configuration, phase shift, last maintenance date, manufacturer, model. The AR view can include operating information such as individual winding voltage, volt-amperes, current, operating status, overall health, remaining lifetime, time remaining to next maintenance, top oil temperature, hot spot temperature, winding temperature, oil level and viscosity.

FIG. 8P(iv) shows an exemplary embodiment including augmented reality with operational information combined with safety information that increases in detail based on the distance from the object. In some embodiments, the closer to the object, pre-configured information can be displayed that is more meaningful. For example, closer to the motor, information regarding the operating status is display along with the personal protective equipment (PPE) that must be worn in order to begin any work on the equipment. Buttons to show the service records, maintenance records, service manuals, work order authorization, lock out tag out (LOTO) status, repair steps, wiring diagram, single line diagram, may be displayed directly on the equipment or on a toolbar adjoining the image. Safety information regarding the area around the equipment may also be displayed, such as tripping hazard, weight limits on temporary scaffolding. The information may be hidden as the mobile client is moved to another location and information pertaining to the new location may be displayed.

FIG. 8P(v) shows an exemplary embodiment including augmented reality with predictive 'what-if' analysis combined with safety information including the ability to view the objects that are inside the target object. For example, the solar inverter shows the internal components of the inverter without opening the front covers allowing for a technician to view the status of the inverter and perform predictive analysis to assess the arc flash hazard at that equipment without even opening the doors. The results of the analysis and the virtually augmented internal details of the inverter may be displayed via mobile client or other wearable virtual reality displays making for a handsfree safer environment. Information regarding the operating status may be displayed along with the personal protective equipment (PPE) that must be worn in order to begin any work on the equipment. Buttons to show the service records, maintenance records, service manuals, work order authorization, lock out tag out (LOTO) status, repair steps, wiring diagram, single line diagram, may be displayed directly on the equipment or on a toolbar adjoining the image.

Other applications for the mobile client may include but not limited to:

Data Synchronization from tablets, PC and mobile devices.

Multi-User database for simultaneous collaboration on single project from multiple hardware devices and operating systems.

Ability to provide hosted cloud for non-corporate users.

Providing easy setup for corporate users to host in their own cloud.

Taking advantage of cloud computing from CPU and GPU perspective.

Splitting into database, system logic, calculation engines, graphics and WebAPI layers.

The system may include a mobile application (e.g., a thin client 702 shown in FIG. 7) common to all tablet and mobile devices and used for the following purposes including but not limited to:

Data collection

Real-time collaborative database (Team member presence)

Real-time GPS location of asset

Real-time GPS tracking of team

Live dashboards

Large network solutions

Software as a Service (SaaS)

Storage cost

Bandwidth cost

Multiplexed data streams

Real-time usage visualization

"FlickIT" technology, users can flick or swipe content between screens, tablets, and mobile phones.

Slide+Voice—User can get an area similar to trackpad to control location of graphics or use voice control to suggest connection locations and enter data values.

A/V—Allow audio & video recording

Social Media Feeds—For a particular area of interest, search through product knowledgebases, online forums and other information repository to display engineering content that is applicable.

Multi-tasking—User can run multiple (e.g., 3, 4, etc.) applications at the same time which is beneficial for system operators responsible for monitoring and controlling their network".

Interaction—User can interact with a VR model which is beneficial, for example, for navigating through composites, zooming/panning.

3D Results—the system can generate 3D results using 2D model and let the user switch superimpose results without switching modes.

The ability to search, display and edit engineering properties of the network model.

An HMI designer that is used for the editing of building real-time or business intelligence dashboards associated with elements on the network model.

Quick calculators for power system engineering including arc flash, per unit, wer factor, filter sizing, cable impedance, line impedance, equipment sizing for quick estimation of missing parameters or conversion of one parameter into another usable parameter.

Application to track crew location and progress when assigned to repair or review an assigned task.

Ability to receive and transmit documents via upload/download links and email through mail client installed on the local device, print directly from application, transmit filtered or grouped data entry forms from one device to another and create user-defined rules, triggers, and action items.

Ability to view, edit display and transfer protective device information, network fault information and fault location from the physical device to the cloud database and to the desktop client for forensic analysis.

Ability to track changes, history and audit the changes through web interface and reporting.

Usage Approach

In some embodiments, a Master application (may be shown as ETAP) and the mobile application will have multiple ways of synchronizing project between each other including: manual sync: ability to export a project or part of a project into a mobile device, e.g., connected via USB, and ability to import a project or part of a project from a mobile device, e.g., connected via USB and WiFi, sync where Master desktop client and the mobile device will communicate project or part of projects changes via Web Server APIs through internet or intranet.

In some embodiments, users can be assigned to various parts of the network or designated areas of responsibility (AOR). AOR is a pre-defined geographic area where authority to view, modify, analyze or control the network is assigned by groups or individuals especially for larger networks where one individual or work shift may be insufficient. Based on AOR network model, information may be published from desktop client to NetPM/DXM/Transaction Manager located in a public or private cloud.

Project information publications can be downloaded from cloud to desktop or mobile clients based on AOR and authentication/access privileges.

Components can be added using drag & drop, speech recognition, inking, real-time communication/plug and play devices or based on augmented reality.

Figure 9:
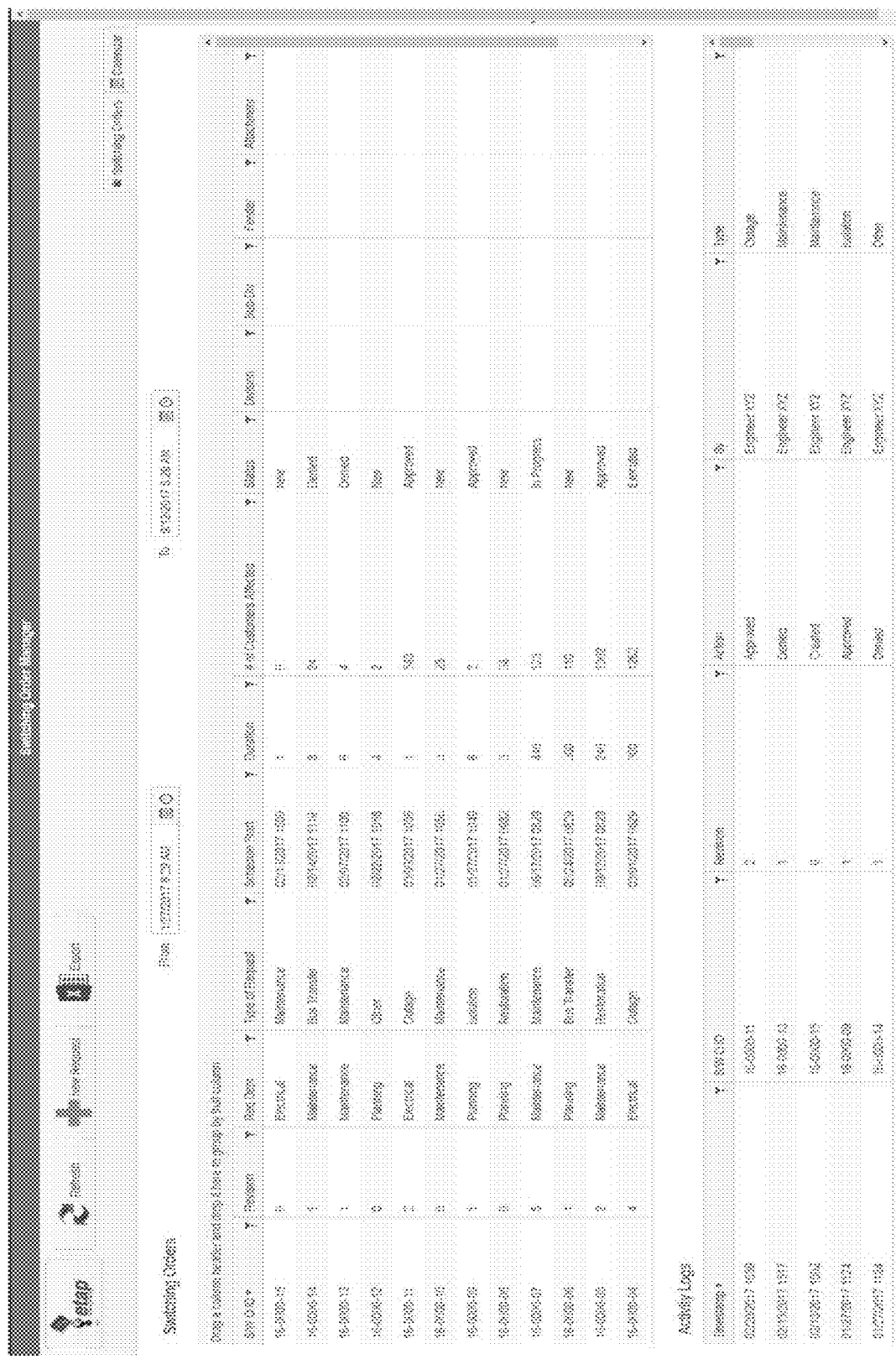
FIGS. 9 to 11 illustrate exemplary user interfaces, according to some embodiments of the present disclosure.
Figure 11:
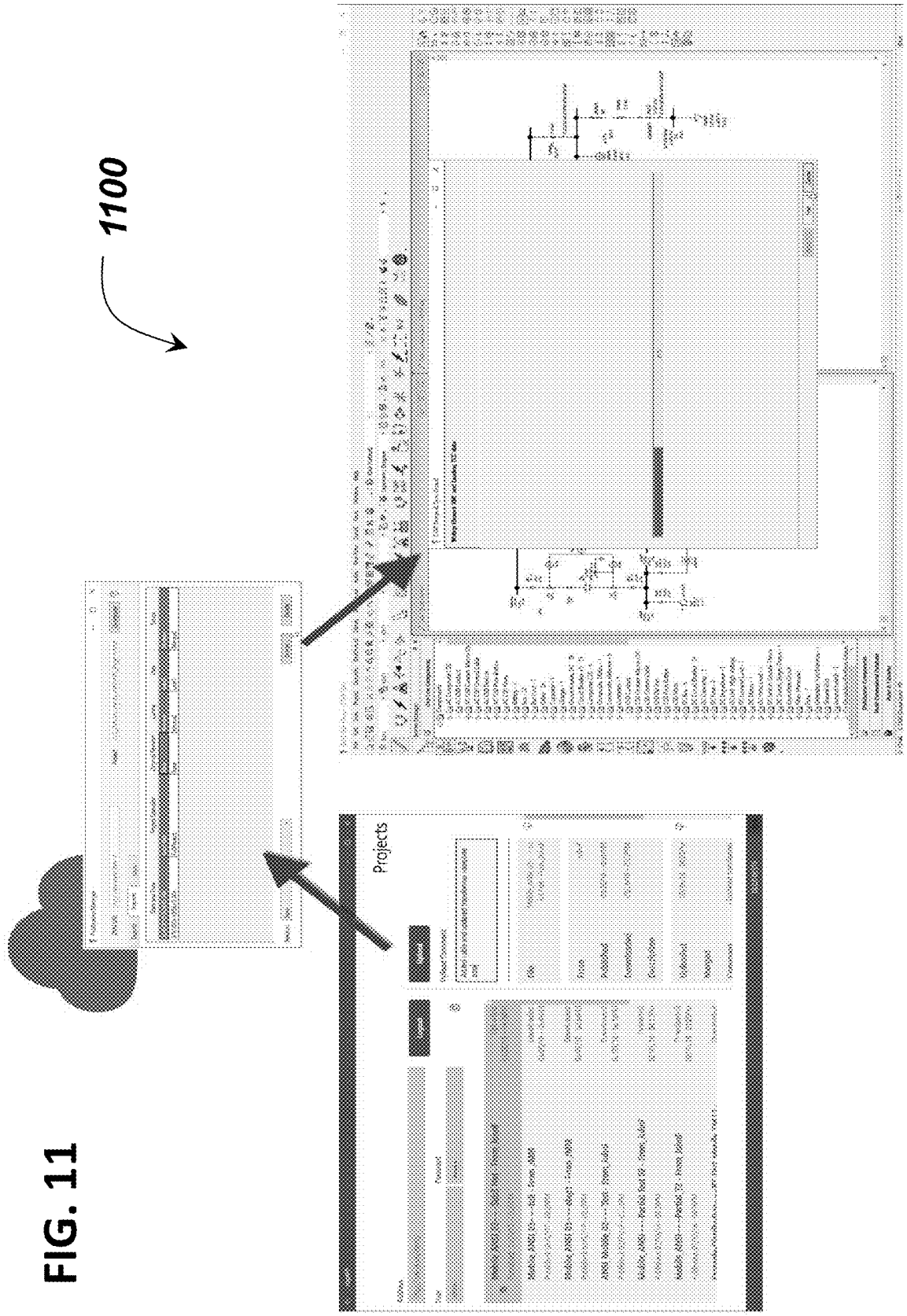

Changes may be merged using change management processes (as illustrated in exemplary user interfaces shown in FIG. 9, FIGS. 10 and 1100 in FIG. 11).

System Architecture

Figure 12:
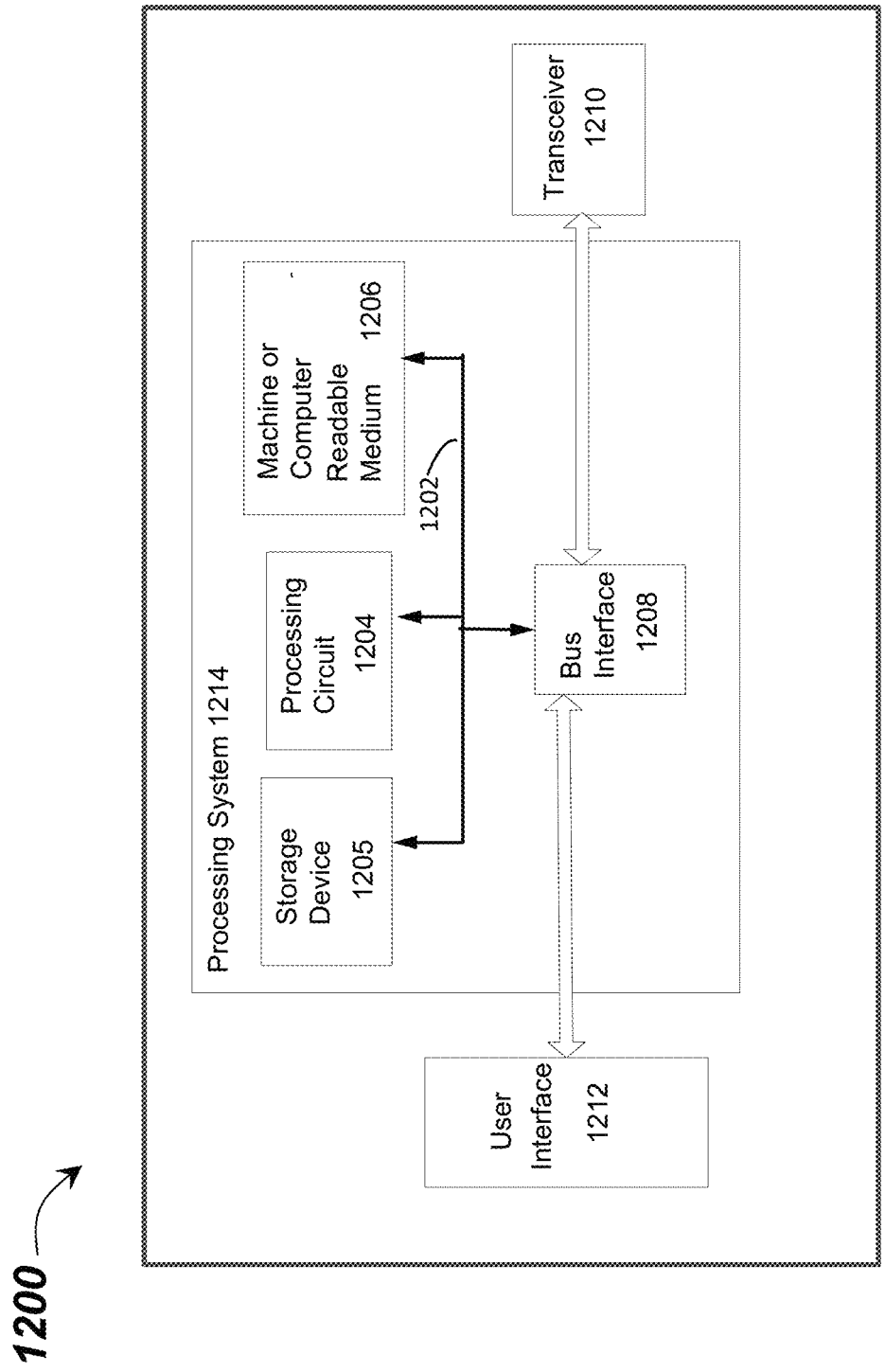
FIG. 12 illustrates an exemplary overall platform in which various embodiments and process steps disclosed herein can be implemented, according to some embodiments of the present disclosure.

FIG. 12 illustrates an exemplary overall platform 1200 in which various embodiments and process steps disclosed herein can be implemented. In accordance with various aspects of the disclosure, an element, or any portion of an element, or any combination of elements may be implemented with a processing system 1214 that includes one or more processing circuits 1204. Processing circuits 1204 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionalities described throughout this disclosure. That is, the processing circuit 1204 may be used to implement any one or more of the various embodiments, systems, algorithms, and processes described above. In some embodiments, the processing system 1214 may be implemented in a server. The server may be local or remote, for example in a cloud architecture.

In the example of FIG. 12, the processing system 1214 may be implemented with a bus architecture, represented generally by the bus 1202. The bus 1202 may include any number of interconnecting buses and bridges depending on the specific application of the processing system 1214 and the overall design constraints. The bus 1202 may link various circuits including one or more processing circuits (represented generally by the processing circuit 1204), the storage device 1205, and a machine-readable, processor-readable, processing circuit-readable or computer-readable media (represented generally by a non-transitory machine-readable medium 1206). The bus 1202 may also link various other circuits such as timing sources, peripherals, voltage regulators, and power management circuits, which are well known in the art, and therefore, will not be described any further. The bus interface 1208 may provide an interface between bus 1202 and a transceiver 1210. The transceiver 1210 may provide a means for communicating with various other apparatus over a transmission medium. Depending upon the nature of the apparatus, a user interface 1212 (e.g., keypad, display, speaker, microphone, touchscreen, motion sensor) may also be provided.

The processing circuit 1204 may be responsible for managing the bus 1202 and for general processing, including the execution of software stored on the machine-readable medium 1206. The software, when executed by processing circuit 1204, causes processing system 1214 to perform the various functions described herein for any apparatus. Machine-readable medium 1206 may also be used for storing data that is manipulated by processing circuit 1204 when executing software.

One or more processing circuits 1204 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

It should also be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

It is to be understood that this disclosure is not limited to the particular embodiments described herein, as such may, of course, vary. It is also to be understood that the terminology used herein is for the purpose of describing particular embodiments only and is not intended to be limiting.

As used herein and in the appended claims, the singular forms "a," "an," and "the" include plural referents unless the context clearly dictates otherwise.

In general, terms such as "coupled to," and "configured for coupling to," and "secure to," and "configured for securing to" and "in communication with" (for example, a first component is "coupled to" or "is configured for coupling to" or is "configured for securing to" or is "in communication with" a second component) are used herein to indicate a structural, functional, mechanical, electrical, signal, optical, magnetic, electromagnetic, ionic or fluidic relationship between two or more components or elements. As such, the fact that one component is said to be in communication with a second component is not intended to exclude the possibility that additional components may be present between, and/or operatively associated or engaged with, the first and second components.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

Various aspects have been presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electronic devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

What is claimed is:

1. A system for utility network system engineering, comprising:
    a server connected to a plurality of client devices via a network, the server configured to:
        generate a utility network system model having project information data;

upon receiving a first request from a client device of the plurality of client devices, transmit the utility network system model to the client device;

receive first change data from the client device, wherein the first change data comprises change data for at least one of utility network asset data, engineering change data, and network configuration change data;

synchronize the first change data with the project information data on a queue- based basis; and transmit the synchronized project information to one or more client devices associated with a list of registered project list users, wherein each client device of the plurality of client devices comprises a thin client configured to:

generate a graphical user interface for display on a display of the each client device of the plurality of client devices, wherein the graphical user interface is at least one of web-based schematic, single-line diagram view, geospatial view, fluid flow, cross-sectional view, 3D view, layout view, street view, process diagram, protection view, and trending chart;

generate the first request;

transmit the first request to the server; receive the utility network system model;

store the utility network system model in a client device local database;

upon receiving one or more local change data, generate the first change data;

transmit the first change data to the server; and upon receiving the synchronized project information, update the graphical user interface with one or more data from the synchronized project information, wherein the graphical user interface further comprises a network view which displays connectivity details from a power, water or gas distribution station.

2. The system of claim 1, wherein the graphical user interface further comprises at least one of human-machine interface (HMI) dashboards, underground assets, underground cross-sectional piping and cable views, 3D views, logical diagrams and wiring diagrams.

3. The system of claim 1, wherein the graphical user interface further comprises a geographic information system (GIS) model which automatically displays equipment information of a network asset when the client device is in physical proximity to the network asset.

4. The system of claim 1, wherein the graphical user interface further displays open and close points between main feeding stations.

5. The system of claim 1, wherein each client device of the plurality of client devices further comprises at least one of camera access service with image recognition, gyro access service, biometric recognition access service, payment access service, microphone access service with speech recognition, augmented reality access service, holographic display access service, inking service, and touch screen access service.

6. The system of claim 1, wherein the graphical user interface further comprises one or more engineering rules.

7. The system of claim 1, wherein the graphical user interface further comprises one or more extended reality applications to display one or more virtual objects.

8. The system of claim 1, wherein the thin client further comprises augmented reality with predictive what-if analysis combined with safety information.

9. A system for utility network system engineering, comprising:

a server connected to a plurality of client devices via a network, the server configured to:

generate a utility network system model having project information data;

upon receiving a first request from a client device of the plurality of client devices, transmit the utility network system model to the client device;

receive first change data from the client device, wherein the first change data comprises change data for at least one of utility network asset data, engineering change data, and network configuration change data;

synchronize the first change data with the project information data on a queue- based basis; and transmit the synchronized project information to one or more client devices associated with a list of registered project list users, wherein each client device of the plurality of client devices comprises a thin client configured to:

generate a graphical user interface for display on a display of the each client device of the plurality of client devices, wherein the graphical user interface is at least one of web-based schematic, single-line diagram view, geospatial view, fluid flow, cross-sectional view, 3D view, layout view, street view, process diagram, protection view, and trending chart;

generate the first request;

transmit the first request to the server; receive the utility network system model;

store the utility network system model in a client device local database;

upon receiving one or more local change data, generate the first change data; transmit the first change data to the server; and upon receiving the synchronized project information, update the graphical user interface with one or more data from the synchronized project information, wherein the thin client is further configured to transmit protective device information, network fault information and fault location to the server.

10. The system of claim 9, wherein the server is further configured to transmit the synchronized project information based on designated areas of responsibility.

11. The system of claim 9, wherein the server further comprises a computation engine configured to generate the utility network system model.

12. The system of claim 11, wherein the server further comprises a computation distributor that monitors a computation load and dynamically creates multiple instances of the computation engine.

* * * * *